(12) United States Patent
Matsumura et al.

(10) Patent No.: US 7,262,262 B2
(45) Date of Patent: Aug. 28, 2007

(54) RESIN COMPOSITION FOR TONER AND TONER

(75) Inventors: Kenichi Matsumura, Koka-gun (JP); Akihiro Niki, Koka-gun (JP); Masayuki Imamura, Koka-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/474,753

(22) PCT Filed: Apr. 11, 2002

(86) PCT No.: PCT/JP02/03592

§ 371 (c)(1),
(2), (4) Date: Feb. 25, 2004

(87) PCT Pub. No.: WO02/084408

PCT Pub. Date: Oct. 24, 2002

(65) Prior Publication Data

US 2004/0132920 A1 Jul. 8, 2004

(30) Foreign Application Priority Data

| Apr. 11, 2001 | (JP) | ............................. 2001-113092 |
| May 16, 2001 | (JP) | ............................. 2001-146378 |
| Jun. 8, 2001 | (JP) | ............................. 2001-173650 |
| Sep. 18, 2001 | (JP) | ............................. 2001-284041 |
| Nov. 2, 2001 | (JP) | ............................. 2001-337564 |
| Nov. 2, 2001 | (JP) | ............................. 2001-338014 |
| Dec. 3, 2001 | (JP) | ............................. 2001-368987 |
| Dec. 3, 2001 | (JP) | ............................. 2001-368988 |
| Feb. 20, 2002 | (JP) | ............................. 2002-043306 |
| Feb. 20, 2002 | (JP) | ............................. 2002-043307 |

(51) Int. Cl.
*C08G 63/02* (2006.01)

(52) U.S. Cl. ................ 528/272; 430/108.1; 430/109.4; 525/418; 525/444; 528/271

(58) Field of Classification Search ............. 430/108.1, 430/109.4; 525/418, 444; 528/271, 272
See application file for complete search history.

(56) References Cited

U.S. PATENT DOCUMENTS

| 4,758,491 | A | * | 7/1988 | Alexandrovich et al. ..................... 430/108.24 |
| 5,358,820 | A | * | 10/1994 | Bugner et al. .............. 430/126 |
| 5,629,121 | A | | 5/1997 | Nakayama |
| 5,714,542 | A | * | 2/1998 | Niinae et al. ................ 525/108 |
| 6,593,434 | B1 | * | 7/2003 | Watanabe ................... 525/437 |

FOREIGN PATENT DOCUMENTS

| EP | 1 126 324 A1 | 8/2001 |
| JP | 56-65146 A | 6/1981 |
| JP | HEI-08-003660 | 12/1987 |
| JP | 63-38955 A | 2/1988 |
| JP | 63-38956 A | 2/1988 |
| JP | 2704282 B2 | 6/1990 |
| JP | 4-97366 A | 3/1992 |
| JP | 2988703 B2 | 4/1992 |
| JP | 4-313760 A | 11/1992 |
| JP | 4-337741 A | 11/1992 |
| JP | 5-44032 A | 2/1993 |
| JP | HEI-07-333905 | 12/1995 |
| JP | HEI-08-152743 | 6/1996 |
| JP | HEI-08-272141 | 10/1996 |
| JP | HEI-09-152745 | 6/1997 |
| JP | 10-36490 A | 2/1998 |
| JP | 2002-72557 A | 3/2002 |
| JP | 2002-131969 A | 5/2002 |

* cited by examiner

*Primary Examiner*—Terressa Boykin
(74) *Attorney, Agent, or Firm*—Sughrue Mion. PLLC

(57) ABSTRACT

The present invention has for its object to provide a resin composition for toner exhibiting excellent low temperature fixation performance, high temperature offset-resistance and anti-blocking performance and enabling a satisfactory color development, as well as a toner thereof. A resin composition for toner which compromises a polymer component capable of forming a physical crosslinking structure and a polyester not forming a physical crosslinking structure but having a glass transition point of 30 to 80° C. or a melting point of 50 to 120° C.

3 Claims, No Drawings

RESIN COMPOSITION FOR TONER AND TONER

TECHNICAL FIELD

The present invention relates to a resin composition for toner exhibiting excellent low temperature fixation performance, high temperature offset-resistance and anti-blocking performance and enabling a satisfactory color development, as well as a toner thereof.

BACKGROUND ART

As a method for developing an electrostatic charged image in an electrophotography and the like, a dry development method is employed frequently. In such a dry development method, a toner is charged usually as a result of the friction with a carrier such as an iron powder, glass beads and the like, and then deposits on an electrostatic latent image on a photoconductor via an electric attractive force, and then is transferred onto a paper and fixed by a heat roller, whereby establishing a permanent visual image.

As a fixation method, a heat roller method is employed frequently in which a toner image on a sheet to be fixed is passed with being brought into contact under pressure with the surface of the heat fixation roller with its surface is made from a material having a toner releasing ability.

In this heat fixation roller method, a toner capable of being fixed at a further lower temperature is desired for the purpose of improving the efficiency of the cost such as power consumption as well as increasing the reproducing speed.

However, in an attempt to improve the low temperature fixation performance described above, problems are encountered such as an offset phenomenon tends to be experienced in which a part of the toner deposits on the surface of the heat fixation roller and subsequently transferred on a paper, or a blocking phenomenon in which the toner tends to be aggregated by the heat exerted to respective resins via various environments.

To solve such problems, Japanese Patent No.2988703 proposes using, as a binder resin for toner, a crystalline polyester resin containing terephalic acid and C2-C6 straight alkylene glycol-derived units in an amount of 50 mole % or more based on the total monomer units employed.

However, this technology suffers from a difficulty in maintaining a high temperature offset-resistance and an anti-blocking performance without affecting the lower temperature fixation performance adversely, since it employs only a crystalline polyester resin which narrows the range of the temperature enabling the fixation.

Japanese Patent No.2704282 proposes using, as a binder resin for toner, a non-crystalline polyester resin obtained by polymerizing a trivalent or higher valency-carrying monomer, an aromatic dicarboxylic acid and an aliphatic alcohol containing a branched chain-carrying aliphatic alcohol in an amount of 50 mole % or more.

However, this technology suffers from an insufficient low temperature fixation performance since it employs only a non-crystalline polyester resin.

Japanese Kokai Publication Hei-4-97366 and Japanese Kokai Publication Hei-4-313760 propose, as a toner exhibiting an excellent balance of the low temperature fixation performance and the high temperature offset-resistance, a toner containing as toner resins two types of the polyesters having different softening points.

However, the compatibility between these two polyesters is not sufficient, and the polyester having a lower softening point allows the blocking to occur easily, and deposits onto the fixation roller to allow the filming to occur easily, and a disadvantageously reduced transparency of the resin due to the poor compatibility is also encountered.

Japanese Kokoku Publication Hei-5-44032 proposes using, as a binder resin for toner, a block copolymer of a low melting point crystalline polyester and a high melting point crystalline polyester.

However, this technology involves a problem of difficulty in obtaining a transparent resin since the binder resin becomes an opaque resin.

Also since a blocking phenomenon is readily experienced when a toner is exposed to a temperature higher than the glass transition point of the toner resin, the development of a toner polyester resin, which hardly undergoes a blocking phenomenon is also under way. As a toner polyester resin which hardly undergoes a blocking phenomenon although its low temperature fixation temperature is not so low, a polyester resin having a specific composition which gives a satisfactory effect is disclosed in Japanese Kokai Publication Hei-4-337741, while Japanese Kokai Publication Hei-10-36490 describes that it is effective to specify the composition of the polyester resin, and to limit the glass transition point within the range from 45 to 70° C.

However, even when using the toner resins of these technologies, the problematic blocking phenomenon is experienced upon exposure of the toner to a temperature around the glass transition point of the toner resin, although the blocking phenomenon at ambient temperature is less encountered.

SUMMARY OF THE INVENTION

An objective of the present invention is to provide a resin composition for toner exhibiting excellent low temperature fixation performance, high temperature offset-resistance and anti-blocking performance and enabling a satisfactory color development, as well as a toner thereof.

The first present invention is a resin composition for toner which comprises a polymer component capable of forming a physical crosslinking structure and a polyester not forming a physical crosslinking structure but having a glass transition point of 30 to 80° C. or a melting point of 50 to 120° C. In the resin composition for toner of the first present invention, it is preferred that the polymer component capable of forming a physical crosslinking structure and the polyester not forming a physical crosslinking structure but having a glass transition point of 30 to 80° C. or a melting point of 50 to 120° C. are present in a mixture.

The second present invention is a resin composition for toner which comprises, as a major component, a polyester block copolymer comprising a crystalline polyester segment having a melting point of 140 to 280° C. and a non-crystalline polyester segment having a glass transition point of 30 to 80° C.

The third present invention is a resin composition for toner which comprises, as a major component, a polyester block copolymer comprising a crystalline polyester segment having a melting point of 140 to 280° C., a crystalline polyester segment having a melting point of 50 to 120° C. and a non-crystalline polyester segment having a glass transition point of 30 to 80° C.

The fourth present invention is a resin composition for toner which comprises, as a major component, a mixture comprising a polyester block copolymer containing a crystalline polyester segment having a melting point of 140 to 280° C. and a non-crystalline polyester segment having a glass transition point of 30 to 80° C. and a crystalline polyester having a melting point of 50 to 120° C.

In the second, third or fourth present invention, it is preferable that the non-crystalline polyester segment having a glass transition point of 30 to 80° C. comprises, as major components, a dicarboxylic acid and a diol, and derives from a polymer obtained by polymerizing a monomer mixture containing at least either a divalent bending monomer capable of introducing a bending molecular structure into the molecular chain or a divalent monomer having a branched chain, and it is also preferable that the crystalline polyester segment having a melting point of 140 to 280° C. is derived from a polymer obtained by polymerizing 1,4-cyclohexane dimethanol, ethylene glycol and terephthalic acid, and the non-crystalline polyester segment is derived from a polymer obtained by polymerizing terephthalic acid, o-phthalic acid and neopentyl glycol. It is also preferable that the polyester block copolymer mentioned above comprises 1 to 70% by weight of the crystalline polyester segment having a melting point of 140 to 280° C. and 99 to 30% by weight of the non-crystalline polyester segment having a glass transition point of 30 to 80° C. In addition, it is also preferable that the non-crystalline polyester segment having a glass transition point of 30 to 80° C. is derived from a polymer obtained by polymerizing a monomer mixture comprising, as major components, a dicarboxylic acid and a diol, and said dicarboxylic acid comprises 80 to 99.9 mole % of terephthalic acid and 20 to 0.1 mole % of o-phthalic acid or phthalic anhydride, and 20 to 100 mole % of said diol is a divalent diol having a branched chain, and it is also preferable that the non-crystalline polyester segment having a glass transition point of 30 to 80° C. is derived from a polymer obtained by polymerizing a monomer mixture comprising, as major components, a dicarboxylic acid and a diol, and said dicarboxylic acid comprises 70 to 94.9 mole % of terephthalic acid, 0.1 to 10 mole % of o-phthalic acid or phthalic anhydride and 5 to 20 mole % of isophthalic acid, and 20 to 100 mole % of said diol is a divalent diol having a branched chain.

The fifth present invention is a resin composition for toner which comprises, as a major component, a polyester-polyamide block copolymer comprising a crystalline polyamide segment having a melting point of 140 to 280° C. and a non-crystalline polyester segment having a glass transition point of 30 to 80° C.

The sixth present invention is a resin composition for toner which comprises, as a major component, a polyester-polyamide block copolymer comprising a crystalline polyamide segment having a melting point of 140 to 280° C. and a crystalline polyester segment having a melting point of 50 to 120° C.

The seventh present invention is a resin composition for toner which comprises, as a major component, a polyester-polyamide block copolymer comprising a crystalline polyamide segment having a melting point of 140 to 280° C., a crystalline polyester segment having a melting point of 50 to 120° C. and a non-crystalline polyester segment having a glass transition point of 30 to 80° C.

The eighth present invention is a resin composition for toner which comprises, as a major component, a mixture comprising a polyester-polyamide block copolymer containing a crystalline polyamide segment having a melting point of 140 to 280° C. and a non-crystalline polyester segment having a glass transition point of 30 to 80° C. and a crystalline polyester segment having a melting point of 50 to 120° C.

In the fifth, sixth, seventh or eighth present invention, it is preferable that the polyester-polyamide block copolymer comprises 1 to 70% by weight of a crystalline polyamide segment having a melting point of 140 to 280° C. and 99 to 30% by weight of a non-crystalline polyester segment having a glass transition point of 30 to 80° C. It is also preferable that the non-crystalline polyester segment having a glass transition point of 30 to 80° C. is derived from an ester polymer obtained by polymerizing a monomer mixture containing at least either a divalent bending monomer capable of introducing a bending molecular structure into the molecular chain comprising, as major components, a dicarboxylic acid and a diol or a divalent monomer having a branched chain comprising, as major components, a dicarboxylic acid and a diol, and it is also preferable that the non-crystalline polyester segment having a glass transition point of 30 to 80° C. is derived from an ester polymer obtained by polymerizing terephthalic acid, o-phthalic acid and neopentyl glycol. In addition, it is preferable that the non-crystalline polyester segment having a glass transition point of 30 to 80° C. is derived from an ester polymer obtained by polymerizing a monomer mixture comprising, as major components, a dicarboxylic acid and a diol, and said dicarboxylic acid comprises 80 to 99.9 mole % of terephthalic acid and 20 to 0.1 mole % of o-phthalic acid or phthalic anhydride, and 20 to 100 mole % of said diol is a divalent diol having a branched chain, and it is also preferable that the non-crystalline polyester segment having a glass transition point of 30 to 80° C. is derived from an ester polymer obtained by polymerizing a monomer mixture comprising, as major components, a dicarboxylic acid and a diol, and said dicarboxylic acid comprises 70 to 94.9 mole % of terephthalic acid, 0.1 to 10 mole % of o-phthalic acid or phthalic anhydride and 5 to 20 mole % of isophthalic acid, and 20 to 100 mole % of said diol is a divalent diol having a branched chain.

The ninth present invention is a resin composition for toner which comprises, as a major component, a non-crystalline polyester having a glass transition point of 50 to 80° C. and contains a polyester block copolymer having a weight mean molecular weight of 20,000 to 200,000 comprises a crystalline polyester segment having a melting point of 140 to 280° C. and a non-crystalline polyester segment having a glass transition point of 30 to 80° C.

The tenth present invention is a resin composition for toner which comprises, as a major component, a non-crystalline polyester having a glass transition point of 50 to 80° C. and contains a polyester block copolymer having a weight mean molecular weight of 20,000 to 200,000 comprising a crystalline polyester segment having a melting point of 140 to 280° C. and a non-crystalline polyester segment having a glass transition point of −70° C. or higher and lower than 30° C.

In the ninth or tenth present invention, it is preferable that comprises 50% by weight or more of a non-crystalline polyester having a glass transition point of 50 to 80° C., more preferably comprises 70% by weight or more. It is also preferable that the non-crystalline polyester segment having a glass transition point of 30 to 80° C. in the polyester block copolymer and the non-crystalline polyester having a glass transition point of 50 to 80° C. are compatible with each other, and it is also preferable that the non-crystalline polyester segment having a glass transition point of 30 to 80° C. in the polyester block copolymer and the non-crystalline polyester having a glass transition point of 50 to 80° C. each contain at least identical dicarboxylic acid and diol.

The eleventh present invention is a resin composition for toner which comprises, as a major component, a non-crystalline polyester having a glass transition point of 50 to 80° C. and contains a polyester-polyamide block copolymer having a weight mean molecular weight of 20,000 to 200,000 comprising a polyamide segment having a melting point of 140 to 280° C. and a non-crystalline polyester segment having a glass transition point of 30 to 80° C. and/or a crystalline polyester segment having a melting point of 50 to 120° C.

The twelfth present invention is a resin composition for toner which comprises, as a major component, a non-crystalline polyester having a glass transition point of 50 to 80° C. and contains a polyester-polyamide block copolymer having a weight mean molecular weight of 20,000 to 200,000 comprising a polyamide segment having a melting point of 140 to 280° C. and a non-crystalline polyester segment having a glass transition point of −70° C. or higher and lower than 30° C.

In the eleventh or twelfth present invention, it is preferable that comprises 50% by weight or more of the non-crystalline polyester having a glass transition point of 50 to 80° C., and more preferably comprises 70% by weight or more is contained. In addition, it is preferable that the non-crystalline polyester segment having a glass transition point of 30 to 80° C. in the polyester-polyamide block copolymer and the non-crystalline polyester having a glass transition point of 50 to 80° C. are compatible with each other, and it is also preferable that the non-crystalline polyester segment having a glass transition point of 30 to 80° C. in the polyester-polyamide block copolymer and the non-crystalline polyester having a glass transition point of 50 to 80° C. each contain at least identical dicarboxylic acid and diol.

The thirteenth present invention is a resin composition for toner which has a storage modulus G depicted in Pa unit, when subjected to a dynamic viscoelasticity test under a condition involving a frequent of 15.92 Hz, a strain of 1%, a temperature of 60 to 300° C. and a temperature elevation rate of 10° C./minute, fulfilling either of the requirement (a), (b) or (c):

(a) when X is assumed to be a constant value selected from an actual number of 1 or more and less than 10, then the range of the temperature fulfilling the requirement defined by the following formula (1) is present over at least 20° C. or more;

(b) when X is assumed to be a constant value selected from an actual number of 1 or more and less than 10, then the range of the temperature fulfilling the requirement defined by the following formula (2) is present over at least 20° C. or more;

(c) when X is assumed to be a constant value selected from an actual number of 1 or more and less than 10, then the range of the temperature fulfilling the requirement defined by the following formula (3) is present over at least 20° C. or more;

$$G=(X\pm0.5)\times10^3 \quad (1)$$

wherein X is a constant value selected from an actual number of 1 or more and less than 10;

$$G=(X\pm0.5)\times10^4 \quad (2)$$

wherein X is a constant value selected from an actual number of 1 or more and less than 10;

$$G=(X\pm0.5)\times10^5 \quad (3)$$

wherein X is a constant value selected from an actual number of 1 or more and less than 10.

The fourteenth present invention is a resin composition for toner, comprising, as a major component, a polyester block copolymer comprising a crystalline polyester segment and a non-crystalline polyester segment, wherein said polyester block copolymer has a blocking rate of 10 to 100%, said blocking rate being defined as $((Sb/Sa)\times100)$, when subjected to the procedure: in which a crystalline polyester resin having a weight mean molecular weight of 10,000 and having an identical composition to that of said crystalline polyester segment is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then heated again at the temperature elevating rate of 10° C./minute to measure the differential calorie of the crystalline polyester resin, then the endothermic calorie (Sa) of the crystal melting endothermic peak per unit resin weight of the crystalline polyester resin is calculated from the peak area of the crystal melting endothermic peak, and then said polyester block copolymer is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then measured again the differential calorie of the polyester block copolymer at the temperature elevating rate of 10° C./minute, while the resin weight of the crystalline polyester segment in said copolymer is calculated from the resin weight of the polyester block copolymer used in the measurement then the endothermic calorie (Sb) of the crystal melting endothermic peak per unit resin weight of the crystalline polyester segment is calculated from the crystal melting endothermic peak area of the crystal part of said copolymer.

The fifteenth present invention is a resin composition for toner, comprising, as a major component, a polyester-polyamide block copolymer comprising a crystalline polyamide segment and a non-crystalline polyester segment, wherein said polyester-polyamide block copolymer has a blocking rate of 10 to 100%, said blocking rate being defined as $((Sb/Sa)\times100)$, when subjected to the procedure: in which a crystalline polyamide resin having a weight mean molecular weight of 10,000 and having an identical composition to that of said crystalline polyamide segment is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then heated again at the temperature elevating rate of 10° C./minute to measure the differential calorie of the crystalline polyamide resin, then the endothermic calorie (Sa) of the crystal melting endothermic peak per unit resin weight of the crystalline polyamide resin is calculated from the peak area of the crystal melting endothermic peak, and then said polyester-polyamide block copolymer is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then measured again the differential calorie of the polyester-polyamide block copolymer at the temperature elevating rate of 10° C./minute, while the resin weight of the crystalline polyamide segment in said copolymer is calculated from the resin weight of the polyester-polyamide block copolymer used in the measurement then the endothermic calorie (Sb) of the crystal melting endothermic peak per unit resin weight of the crystalline polyamide segment is calculated from the crystal melting endothermic peak area of the crystal part of said copolymer.

In the resin composition for toner according to first, second, third, fourth, fifth, sixth, seventh, eighth, ninth, tenth, eleventh, twelfth, thirteenth, fourteenth or fifteenth present invention, it is preferable that a polymer component having a molecular weight measured by a gel permeation chromatography of $10^6$ or more is contained in an amount of 5% by weight or less.

The sixteenth present invention is a toner obtained by using a resin composition for toner according to the first, second, third, fourth, fifth, sixth, seventh, eighth, ninth, tenth, eleventh, twelfth, thirteenth, fourteenth or fifteenth present invention.

DETAILED DISCLOSURE OF THE INVENTION

The present invention is now described in detail.

The resin composition for toner according to the first present invention comprises a polymer component capable of forming a physical crosslinking structure and a polyester not forming a physical crosslinking structure but having a glass transition point of 30 to 80° C. or a melting point of 50 to 120° C.

As used herein, the physical crosslinking structure means a condition in which a pseudo-crosslink is formed by an interaction between the polymer chains rather than a condition in which the polymer chains are crosslinked via a chemical bond. Unlike to a chemical crosslinking, the physical crosslinking undergoes a reduction in the interaction at an elevated temperature or under a strong pressure, and accordingly it allows a polymer, which is in a physical crosslinking structure at a low temperature and does not flow, to flow at an elevated temperature or under a strong pressure.

A polymer component capable of forming a physical crosslinking structure mentioned above is not particularly restricted and may, for example, be a polymer segment such as a high melting point crystalline polymer segment capable of crystallizing the polymer segment at ambient temperature, or a high glass transition point polymer segment capable of freezing the polymer segment at ambient temperature, as well as a polymer segment containing a functional group capable of forming a transient bond such as a hydrogen bond or an ion bond.

A high melting point crystalline polymer segment mentioned above may, for example, be a crystalline polyester segment or a crystalline polyamide segment.

A polymer segment having a high glass transition point mentioned above may, for example, be a segment comprising a polystyrene or polymethyl (meth)acrylate, styrene-isoprene-styrene block polymer, styrene-butadiene-styrene block polymer, styrene-ethylenebutylene-styrene block polymer, styrene-ethylenepropylene-styrene block polymer, polystyrene graft polymer, poly methyl (meth)acrylate graft polymer and the like.

The functional group having a hydrogen bonding ability may, for example, be a functional group such as an ureido group and an amide group which form an urethane bond and an amide bond. A preferred one among the polymers having the functional groups forming hydrogen bonds may, for example, be an urethane elastomer, a block polymer comprising a polyamide and a non-crystalline polyester, a block polymer comprising a polyamide and a crystalline polyester having a low melting point, amide elastomer and the like.

The functional group having an ion bonding ability may, for example, be a carboxyl group, and an ionomer resin in which the carboxyl groups of the respective polymers are attached to each other via metal ions may also be exemplified.

The resin composition for toner according to the first present invention comprises a polyester not forming a physical crosslinking structure but having a glass transition point of 30 to 80° C. or a melting point of 50 to 120° C. A glass transition point less than 30° C. or a melting point less than 50° C. may lead to a reduced storage stability, while a glass transition point exceeding 80° C. or a melting point exceeding 120° C. may lead to an insufficient ability of improving the low temperature fixation performance.

The resin composition for toner according to the first present invention, it is preferable that the polymer component capable of forming a physical crosslinking structure and the polyester not forming a physical crosslinking structure but having a glass transition point of 30 to 80° C. or a melting point of 50 to 120° C. are present in a mixture.

A conventional polyester-based toner is imparted with an anti-offset ability by a method in which multifunctional monomers usually having three or more functionalities are copolymerized to form a chemical crosslinking structure within the polymer. However, such a method suffers from a poor gloss due to the irregular printing surface after being fixed by a fixation roll due to the presence of the components which are insoluble in the polymer, and also suffers from a limited low temperature fixation performance.

The resin composition for toner according to the first present invention enables the improvement in the high temperature offset-resistance at the same time with the improvement in the gloss and the low temperature fixation performance as a result of incorporating a polymer component capable of forming a physical crosslinking structure and a polyester not forming a physical crosslinking structure but having a glass transition point of 30 to 80° C. or a melting point of 50 to 120° C. Thus, the incorporation of a polymer component capable of forming a physical crosslinking structure and a polyester which does not form a physical crosslinking structure and has a glass transition point of 30 to 80° C. or a melting point of 50 to 120° C. leads to an increased polymer viscosity, which results in the improvement in the anti-offset performance, while it allows the polymer viscosity to be reduced upon pressurizing with the fixation roll, whereby giving an increased smoothness of the printing surface, which enables the improvement in the gloss at the same time with the improvement in the low temperature fixation performance.

Such a resin composition for toner is typically one which comprising, as a major component, a block copolymer comprising a segment capable of forming a physical crosslinking structure and a polyester segment not forming a physical crosslinking structure but having a glass transition point of 30 to 80° C. or a melting point of 50 to 120° C., or one which comprises, as s major component, a polyester not forming a physical crosslinking structure but having a glass transition point of 30 to 80° C., and it comprises a mixture comprising a block copolymer containing a segment capable of forming a physical crosslinking structure and a polyester segment not forming a physical crosslinking structure but having a glass transition point of 30 to 80° C. or a melting point of 50 to 120° C. A toner obtained by using such a resin composition for toner exhibits excellent low temperature fixation performance, high temperature offset-resistance and anti-blocking performance and enabling a satisfactory color development.

The second present invention is a resin composition for toner which comprises, as a major component, a polyester block copolymer consisting of a crystalline polyester segment having a melting point of 140 to 280° C. (hereinafter sometimes referred to as a high melting point crystalline polyester segment) and a non-crystalline polyester segment having a glass transition point of 30 to 80° C.

The third present invention is a resin composition for toner which comprises, as a major component, a polyester block copolymer comprising a crystalline polyester segment having a melting point of 140 to 280° C., a crystalline polyester segment having a melting point of 50 to 120° C. (hereinafter sometimes referred to as a low melting point crystalline polyester segment) and a non-crystalline polyester segment having a glass transition point of 30 to 80° C. A toner obtained by using a resin composition for toner which comprises, as a major component, such a ternary polyester block copolymer is more preferable when compared with a toner obtained by using a resin composition for toner which comprises, as a major component, a binary polyester block copolymer of the second present invention, since it exhibits a further improved low temperature fixation performance and is capable of preventing the filming phenomenon experienced as a deposition of the toner as a film on the fixation roller.

The fourth present invention is a resin composition for toner which comprises, as a major component, a mixture comprising a polyester block copolymer containing a crystalline polyester segment having a melting point of 140 to 280° C. and a non-crystalline polyester segment having a glass transition point of 30 to 80° C. and a crystalline polyester having a melting point of 50 to 120° C. (hereinafter sometimes referred to as a low melting point crystalline polyester segment).

In the polyester block copolymer employed in the resin composition for toner according to the second, third and fourth present inventions, each of the high melting point crystalline polyester segment and the low melting point crystalline polyester segment are derived from a polymer obtained by the condensation polymerization of a dicarboxylic acid and a diol.

The dicarboxylic acid mentioned above may, for example, be o-phthalic acid, terephthalic acid, isophthalic acid, succinic acid, adipic acid, sebacic acid, azelaic acid, octylsuccinic acid, cyclohexanedicarboxylic acid, naphthalenedicarboxylic acid, fumaric acid, maleic acid, itaconic acid as well as an acid anhydride and a lower alkyl ester thereof. Among those listed above, terephthalic acid, naphthlenedicarboxylic acid and an acid anhydride and a lower alkyl ester thereof are employed preferably for imparting a crystallinity.

The diol mentioned above may, for example, be an aliphatic diol such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butandiol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol; an alicyclic diol such as 2,2-bis(4-hydroxycyclohexyl)propane, 2,2-bis(4-hydroxycyclohexyl)propane-alkylene oxide adduct, 1,4-cyclohexanediol, 1,4-cyclohexanedimethanol and the like.

Meanwhile, when a bisphenol is contained, a resin composition for toner having an excellent offset resistance is obtained. However, a resin composition for toner containing a large amount of a bisphenol may undergo the coloration. Accordingly, for the purpose of obtaining a resin composition for toner undergoing no coloration, it is preferable that a bisphenol is not contained as a diol.

The melting point of a high melting point crystalline polymer segment mentioned above is 140 to 280° C. The melting point less than 140° C. leads to a difficulty in obtaining sufficient high temperature offset resistance or anti-blocking performance, while the melting point exceeding 280° C. leads to a need of a high temperature above 280° C. upon melting in the block polymerization, which results in a substantial reduction in the productivity.

As a high melting point crystalline polymer segment mentioned above, a segment derived from a polymer obtained by copolymerizing 1,4-cyclohexanedimethanol, ethylene glycol and terephthalic acid is preferred since it has an excellent balance between the low temperature fixation performance and the high temperature offset resistance. In order to obtain a further improved high temperature offset resistance, a crystalline polyester segment having a high melting point is preferred, and those derived from a polyethylene terephthalate (PET), polyethylene naphthalate (PEN), polybutylene naphthalate (PBN) and the like are preferred. In order to obtain a further improved low temperature fixation performance to prevent any blocking, it is preferred that the high melting point crystalline polyester segment is derived from a polybutylene terephthalate (PBT).

The melting point of a low melting point crystalline polymer segment mentioned above is 50 to 120° C. The melting point less than 50° C. may lead to a poor anti-blocking performance, while the melting point exceeding 120° C. may lead to an insufficient improvement in the low temperature fixation performance.

The low melting point crystalline polyester segment mentioned above is preferably derived from an aliphatic polyester polymer or an alicyclic polyester polymer.

The non-crystalline polyester segment mentioned above is derived from a polymer obtained by polymerizing a monomer mixture which comprises, as major components, a dicarboxylic acid and a diol.

The dicarboxylic acid mentioned above may, for example, be a dicarboxylic acid such as terephthalic acid, succinic acid, adipic acid, sebacic acid, azelaic acid, octylsuccinic acid, cyclohexanedicarboxylic acid, fumaric acid, maleic acid, itaconic acid as well as an acid anhydride and a lower alkyl ester thereof.

The diol mentioned above may, for example, be an aliphatic diol such as ethylene glycol, 1,3-propanediol, 1,4-butanediol, diethylene glycol, 1,5-pentanediol, 1,6-hexanediol, dipropylene glycol, triethylene glycol, tetraethylene glycol; an alicyclic diol such as 1,4-cyclohexanediol, 1,4-cyclohexanedimethanol and the like.

Meanwhile, in order to use such a monomer to obtain a polymer as a starting material for a non-crystalline polyester segment described above, it may be polymerized a monomer mixture, which comprises as major components, several types of dicarboxylic acids and several types of diols.

Meanwhile, when a bisphenol is contained, a resin composition for toner having an excellent offset resistance is obtained. However, a resin composition for toner containing a large amount of a bisphenol may undergo the coloration. Accordingly, for the purpose of obtaining a resin composition for toner undergoing no coloration, it is preferable that a bisphenol is not contained as a diol.

The glass transition point of a non-crystalline polyester segment of a polyester block copolymer mentioned above is 30 to 80° C. The glass transition point less than 30° C. leads to an insufficient high temperature offset resistance or antiblocking performance, while the glass transition point exceeding 80° C. may lead to a substantial deterioration of the low temperature fixation performance. Preferably, the glass transition point is 40 to 70° C.

Meanwhile, with regard to the glass transition point of the non-crystalline polyester segment, an aromatic dicarboxylic acid such as terephthalic acid serves to increase the glass transition point, while a long chain aliphatic dicarboxylic acid such as sebacic acid and adipic acid serves to reduce the glass transition point, and thus a desired glass transition point can be obtained via an appropriate combination of these dicarboxylic acids.

However, the softening point tends to be increased excessively, although a desired glass transition point can be obtained via an appropriate combination of an aromatic dicarboxylic acid and a long chain aliphatic dicarboxylic.

Accordingly, the non-crystalline polyester segment mentioned above is preferably derived from a polymer obtained by polymerizing a monomer mixture containing a polyvalent carboxylic acid and a polyvalent alcohol containing at least either a divalent bending monomer capable of introducing a bending molecular structure into the molecular chain or a divalent monomer having a branched chain. The polymer obtained by polymerizing a monomer mixture containing such a divalent bending monomer or a branched-chained divalent monomer allows a desired glass transition point and a desired low softening point to be obtained at the same time more easily.

The non-crystalline polyester segment mentioned above is preferably contained in a monomer mixture constituting a polymer derived from a divalent bending monomer capable of introducing a bending molecular structure into the molecular chain or a divalent monomer having a branched chain. By introducing a bending monomer or a branched-chained monomer as a constituent monomer of a polymer, the crystallization of a segment can efficiently be prevented.

The divalent bending monomer mentioned above is not restricted to a dicarboxylic acid or a diol, as long as it is a monomer capable of introducing a bending molecular structure into the molecular chain of a polymer, such as an aromatic dicarboxylic acid whose ortho or meta position is substituted by a carboxyl group, an aromatic diol whose ortho or meta position is substituted by a hydroxyl group, a polycyclic aromatic dicarboxylic acid having carboxylic groups at asymmetric positions, a polycyclic aromatic diol having hydroxyl groups at asymmetric positions and the like, and those which may also be exemplified are dicarboxylic anhydrides or lower esters, monohydroxy monocarboxylic acid and the like, including a dicarboxylic acid and an anhydride thereof such as phthalic anhydride, o-phthalic acid, isophthalic acid, 1,4-naphthalenedicarboxylic acid, 2,7-naphthalenedicarboxylic acid and the like, as well as a monohydroxymonocarboxylic acid such as salicylic acid, 3-hydroxy-2-naphthalene carboxylic acid and a diol such as catechol.

A divalent monomer having a branched chain effectively inhibits the crystallization of a polyester block copolymer by means of the steric hindrance of its branched chain. As a monomer having a branched chain inhibiting the crystallization effectively, an aliphatic diol having a branched alkyl chain or an alicyclic diol having a branched alkyl chain may be exemplified. Meanwhile, as an alicyclic diol, an alicyclic diol in which several alicyclic diols are attached to each other via a branched alkylene chain is preferred.

The divalent monomer having a branched chain mentioned above is not particularly restricted and may, for example, be an aliphatic diol such as 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, 2-butyl-2-ethyl-1,3-propanediol, 2,4-diethyl-1,5-pentanediol and the like; an alicyclic diol such as 2,2-bis(4-hydroxycyclohexyl)propane, 2,2-bis(4-hydroxycyclohexyl)propane-alkylene oxide adduct and the like.

In the polyester block copolymer mentioned above, the high melting point crystalline polyester segment is preferably derived from a polymer obtained by polymerizing 1,4-cyclohexane dimethanol, ethylene glycol and terephthalic acid, and the non-crystalline polyester segment is preferably derived from a polymer obtained by polymerizing terephthalic acid, o-phthalic acid and neopentyl glycol.

More preferably, the dicarboxylic acid comprises 70 to 94.9 mole % of terephthalic acid, 0.1 to 10 mole % of o-phthalic acid or phthalic anhydride and 5 to 20 mole % of isophthalic acid, and 20 to 100 mole % of the diol is a diol having a branched chain. As a constituent monomer, a common monomer component such as terephthalic acid can be employed in a non-crystalline polyester segment and a crystalline polyester segment, whereby improving the compatibility between the both and further improving the transparency. The transparency is improved also by polymerizing isophthalic acid.

While a polyester block copolymer described above is preferably a polyester resin having no crosslinking structure, it is also possible that, for the purpose of raising the glass transition point of the resin to improve the high temperature offset resistance, an alcohol having three or more valencies or a carboxylic acid having three or more valencies may be employed as a monomer to impart the polyester block copolymer with a crosslinking structure.

The alcohol having three or more valencies mentioned above may, for example, be glycerin, trimethylolethane, trimethylolpropane, pentaerythritol, sorbitol and the like.

The carboxylic acid having three or more valencies mentioned above may, for example, be trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid as well as anhydrides or lower esters thereof.

In a resin composition for toner according to the fourth present invention, the low melting point crystalline polyester to be mixed in a polyester block copolymer mentioned above has a melting point of 50 to 120° C. The melting point less than 50° C. may lead to a reduced storage stability. The melting point exceeding 120° C. may lead to an insufficient improvement in the low temperature fixation performance.

In the polyester block copolymer comprising a high melting point crystalline polyester segment and a non-crystalline polyester segment employed in the resin composition for toner according to the second and fourth present invention, preferably contains 1 to 70% by weight of the high melting point crystalline polyester segment and 99 to 30% by weight of the non-crystalline polyester segment. An amount of the high melting point crystalline polyester segment less than 1% by weight may lead to an insufficient high temperature offset resistance, while that exceeding 70% by weight may lead to an insufficient low temperature fixation performance. More preferably, 3 to 70% by weight of the high melting point crystalline polyester segment and 97 to 30% by weight of the non-crystalline polyester segment are contained.

In the polyester block copolymer comprising a high melting point crystalline polyester segment, a low melting point crystalline polyester segment and a non-crystalline polyester segment employed in the resin composition for toner according to the third present invention, it is preferable that the low melting point crystalline polyester segment contained in the polyester block copolymer is present in an amount of 20% by weight or less, and 3 to 70% by weight of the high melting point crystalline polyester segment and 97 to 30% by weight of the non-crystalline polyester segment are present based on 100% by weight as the total weight of the high melting point crystalline polyester segment and the non-crystalline polyester segment, and it is more preferable that 3 to 70% by weight of the high melting point crystalline polyester segment, 0.5 to 20% by weight of the low melting point crystalline polyester segment and 96.5 to 10% by weight of the non-crystalline polyester segment are present.

When a low melting point crystalline polyester is mixed in a polyester block copolymer mentioned above in the resin composition for toner according to the fourth present invention, it is preferable that the polyester block copolymer contains 3 to 70% by weight of a high melting point crystalline polyester segment and 97 to 30% by weight of a non-crystalline polyester segment, and the low melting point crystalline polyester segment in an amount of 20% or less is mixed based on 100% by weight as the total weight of the polyester block copolymer and the low melting point crystalline polyester.

The weight mean molecular weight of a polyester block copolymer mentioned above is preferably 5,000 to 30,000. The molecular weight less than 5,000 poses a difficulty in obtaining a sufficient high temperature offset resistance, while that exceeding 30,000 leads to a poor low temperature fixation performance. More preferably, the molecular weight is 10,000 to 20,000.

A method for producing a polymer serving as a starting material for a crystalline polyester segment and a non-crystalline polyester segment described above is not particularly restricted, but the production can be accomplished by esterifying each monomers mentioned above at a temperature of 180 to 290° C. in the presence of an esterification catalyst in an inert gas atmosphere.

The esterification catalyst mentioned above may, for example, be zinc oxide, tin compound such as stannous oxide, dibutyltin oxide, dibutyltin laurate and the like; a metal alkoxide such as titanium tetrabutoxide.

Since a phosphorus-based compound exhibits a high inhibitory effect on the catalytic effect especially of a titanium catalyst, the addition of a phosphorus-based compound in the case where the catalyst remains in a crystalline polyester polymer or non-crystalline polyester polymer serves to promote the block polymerization reaction without any inhibition of the block polymerization reaction. Accordingly, it is preferable that a titanium catalyst is employed in the production of a polymer while adding a phosphorus-based compound upon block polymerization.

A method for producing such a polyester block copolymer is not particularly restricted and may, for example, be a method in which a crystalline polyester polymer having a weight mean molecular weight of 2,000 to 100,000 and a non-crystalline polyester polymer having s weight mean molecular weight of 2,000 to 30,000 are block copolymerized in the presence of a phosphorus-based compound.

By using a crystalline polyester polymer and a non-crystalline polyester polymer whose molecular weights are specified above, a block formation can be controlled without reducing the reaction efficiency.

When a strength is required in the resin composition for toner according to the present invention, the weight mean molecular weight of a crystalline polyester polymer mentioned above is preferably 5,000 to 100,000, more preferably 10,000 to 100,000.

The weight mean molecular weight of a non-crystalline polyester polymer mentioned above is preferably 5,000 to 30,000, more preferably 10,000 to 25,000.

For adjusting the weight mean molecular weight of a non-crystalline polyester polymer mentioned above within the range from 2,000 to 30,000, it is preferable to conduct the esterification reaction under non-reduced pressure. A reduced pressure leads to an increased viscosity and a larger molecular weight of the polyester polymer, which result in a substantial reduction in the reactivity in the block forming reaction. Such a reduced reactivity poses a disadvantageous need of elevating the reaction temperature or a prolonged reaction time.

The phosphorus-based compound described above is not particularly restricted and may, for example, be phosphoric acid, phosphorous acid, salt thereof, phosphine and the like.

The salt of phosphoric acid or phosphorous acid may, for example, be phosphoric ester, phosphoric acid amide, phosphorous ester, phosphorous acid amide and the like. Phosphoric acid and phosphorous acid are particularly preferred.

The amount of a phosphorus-based compound mentioned above is preferably an equimolar amount to 1.5 molar excess amount based on the total amount of the esterification reaction catalysts employed upon producing a crystalline polyester polymer or a non-crystalline polyester polymer. An amount less than an equimolar amount allows the esterification reaction catalyst remaining in the resultant polymer to cleave the crystalline polyester polymer or the non-crystalline polyester polymer into low molecular weight segments depending on the reaction conditions of the block copolymerization, and also allows the segments once cleaved to undergo a block polymerization again whereby giving a polyester resin in which low molecular weight polymers are block copolymerized, while an amount exceeding 1.5 molar excess amount the phosphorus-based compound is bound to almost all of the terminals of the polyester polymer whereby inhibiting the block polymerization and posing a difficulty in achieving a sufficient polymerization rate under a gentle condition.

A typical method for producing the polyester block copolymer mentioned above may, for example, be a manufacturing method with three reaction containers in which each of a crystalline polyester polymer and a non-crystalline polyester polymer is polymerized and then block polymerized, or a manufacturing method with two reaction containers in which a separately and previously polymerized crystalline polyester polymer is added during or after the polymerization of a non-crystalline polyester polymer whereby effecting a block polymerization, or in which a separately and previously polymerized non-crystalline polyester polymer is added during or after the polymerization of a crystalline polyester polymer whereby effecting a block polymerization.

The manufacturing method with two reaction containers is preferred especially because of the use of a reduced number of the reaction containers, which leads to a reduced process time.

The manufacturing method with two reaction containers for producing a polyester block copolymer mentioned above may, for example, be a method in which a separately and previously polymerized crystalline polyester polymer and phosphorous acid are added to a reaction container where a non-crystalline polyester polymer has been polymerized, and heated at 250° C. under atmospheric pressure in a nitrogen gas atmosphere to melt the crystalline polyester sufficiently, and then the block formation reaction is continued for 10 minutes with stirring at 60 rpm at 250° C., and then the reaction system is subjected to a reduced pressure of 665 Pa or less, and reacted for 10 minutes with stirring at 60 rpm at 250° C., or a method in which after polymerizing a non-crystalline polyester polymer, a separately and previously polymerized crystalline polyester polymer and phosphorous acid are added to the same reaction container, and heated at 250° C. under atmospheric pressure in a nitrogen gas atmosphere to melt the crystalline polyester sufficiently, and then the block formation reaction is continued for 30 minutes with stirring at 60 rpm at 240° C., and then the reaction system is subjected to a reduced pressure of 665 Pa or less, and reacted for 30 minutes with stirring at 60 rpm at 240° C. It is also preferred to reduce the pressure in the reaction container upon block polymerization.

As a result, a low molecular weight polymer contained in a crystalline polyester polymer and/or a non-crystalline polyester polymer or a volatile polymer under reduced pressure which is generated in the reaction can be released into the outside of the system, whereby allowing the equilibration of the ester exchange reaction to shift to a point at which the polymer can readily be imparted with a higher molecular weight. Also since the polymer is difficult to be cleaved into lower molecular segments when compared with a case where the pressure is not reduced, a polymer having a higher molecular weight can be obtained. A polymer having a higher molecular weight is produced also since the lower molecular weight polymer and the volatile polymer under reduced pressure which has been generated in the reaction can be released into the outside of the system in response to the reduction in the pressure.

The reaction temperature in the block polymerization described above should be a temperature not lower than the melting point of the crystalline polyester polymer. While the temperature of the reaction system is preferably high for the purpose of proceeding the ester exchange reaction for the block formation smoothly by means of melting the crystalline polyester polymer uniformly, it becomes difficult here to control the reaction whereby allowing randomization, thermal deterioration and coloration to occur easily. Accordingly, it is preferable for the purpose of controlling the reaction and preventing the thermal deterioration and the coloration that the temperature of the reaction system is maintained once at a temperature not lower than the melting point of the crystalline polyester polymer to ensure a sufficient melting of the crystalline polyester polymer followed by the reduction in the temperature of the reaction system to an extent which does not allow the crystal to be precipitated at which temperature the reaction is further continued.

The reaction temperature of the block polymerization is preferably 220 to 270° C. The reaction temperature less than 220° C. leads to an insufficient reactivity, while that exceeding 270° C. leads to a tendency of the thermal deterioration or the coloration.

A method for mixing upon the block polymerization is not particularly restricted and may, for example, be a mixing by melting, heat kneading, dissolving in a solvent and the like. Among those listed above, the mixing by melting is employed preferably since it allows the reaction of the resultant polyester block copolymer to be controlled easily.

The fifth present invention is a resin composition for toner which comprises, as a major component, a polyester-polyamide block copolymer comprising a crystalline polyamide segment having a melting point of 140 to 280° C. and a non-crystalline polyester segment having a glass transition point of 30 to 80° C.

The sixth present invention is a resin composition for toner which comprises, as a major component, a polyester-polyamide block copolymer comprising a crystalline polyamide segment having a melting point of 140 to 280° C. and a crystalline polyester segment having a melting point of 50 to 120° C.

The seventh present invention is a resin composition for toner which comprises, as a major component, a polyester-polyamide block copolymer comprising a crystalline polyamide segment having a melting point of 140 to 280° C., a crystalline polyester segment having a melting point of 50 to 120° C. (a low melting point crystalline polyester segment) and a non-crystalline polyester segment having a glass transition point of 30 to 80° C.

The eighth present invention is a resin composition for toner which comprises, as a major component, a mixture comprising a polyester-polyamide block copolymer containing a polyamide segment having a melting point of 140 to 280° C. and a non-crystalline polyester segment having a glass transition point of 30 to 80° C. and a crystalline polyester having a melting point of 50 to 120° C. (a low melting point crystalline polyester).

The melting point of the crystalline polyamide segment mentioned above is 140 to 280° C. A melting point less than 140° C. leads to a difficulty in obtaining sufficient high temperature offset resistance or anti-blocking performance, while that exceeding 280° C. leads to a need of a high temperature above 280° C. upon melting in the block polymerization, which results in a substantial reduction in the productivity.

The crystalline polyamide segment mentioned above is derived from an amide polymer including an aliphatic nylon such as 4-nylon, 6-nylon, 6,6-nylon, 11-nylon, 12-nylon, 6,10-nylon, 6,12-nylon and the like; aromatic nylon, alicyclic nylon and the like.

Since a crystalline polyamide has a high intermolecular cohesive force, a high temperature offset resistance can be obtained by block polymerizing only a small amount of an amide polymer with an ester polymer, whereby increasing the strength of the resin itself.

The non-crystalline polyester segment having a glass transition point of 30 to 80° C. and the low melting point crystalline polyester segment in a polyester-polyamide block copolymer mentioned above and a low melting point crystalline polyester to be added are similar to those employed in a polyester block copolymer mentioned above.

While a polyester-polyamide block copolymer mentioned above preferably has no crosslinking structure, it is also possible that for the purpose of raising the glass transition point of the resin to improve the high temperature offset resistance, an alcohol having three or more valencies or a carboxylic acid having three or more valencies may be employed as a monomer to impart the polyester-polyamide block copolymer with a crosslinking structure. The alcohol having three or more valencies may be those listed for a polyester block copolymer mentioned above.

The polyester-polyamide block copolymer comprises a crystalline polyamide segment and a non-crystalline polyester segment employed preferably contains 1 to 70% by weight of the crystalline polyamide segment and 99 to 30% by weight of the non-crystalline polyester segment. The amount of the crystalline polyamide segment less than 1% by weight may lead to an insufficient high temperature offset resistance, while that exceeding 70% by weight may lead to an insufficient low temperature fixation performance. More preferably, 3 to 70% by weight of the crystalline polyamide segment and 97 to 30% by weight of the non-crystalline polyester segment are contained.

The weight mean molecular weight of a polyester-polyamide block copolymer described above is preferably 5,000 to 35,000. The weight mean molecular weight less than 5,000 poses a difficulty in obtaining a sufficient high temperature offset resistance, while that exceeding 35,000 leads to a poor low temperature fixation performance. More preferably, the weight mean molecular weight is 10,000 to 30,000.

A method for producing such a polyester-polyamide block copolymer is not particularly restricted and may, for example, be a method in which an amide polymer whose weight mean molecular weight is 2,000 to 100,000 and an ester polymer whose weight mean molecular weight is 2,000 to 25,000 are block copolymerized in the presence of a phosphorus-based compound to form a polyester-polyamide block copolymer. As used herein, an amide polymer and an ester polymer include an amide oligomer and an ester oligomer.

By using an amide polymer and an ester polymer whose molecular weights are specified above, a block formation can be controlled without reducing the reaction efficiency.

The weight mean molecular weight of the amide polymer mentioned above is preferably 5,000 to 100,000, more preferably 10,000 to 100,000.

The weight mean molecular weight of the ester polymer mentioned above is preferably 5,000 to 25,000, more preferably 10,000 to 25,000.

Meanwhile, these starting polymers may be cleaved into shorter segment. Accordingly, the molecular weight of a starting polymer may be increased in relation to the molecular weight of an intended polyester-polyamide block copolymer. A method for adjusting the weight mean molecular weight of the ester polymer mentioned above within the range from 2,000 to 25,000 is as mentioned above.

A typical method for producing the polyester-polyamide block copolymer mentioned above may, for example, be a manufacturing method with three reaction containers in which each of an amide polymer and an ester polymer is polymerized and then block polymerized, or a manufacturing method with two reaction containers in which a separately and previously polymerized amide polymer is added during or after the polymerization of an ester polymer whereby effecting a block polymerization, or in which a separately and previously polymerized ester polymer is added during or after the polymerization of an amide polymer whereby effecting a block polymerization. In the case where an amide polymer is provided preliminary such as a case using a commercially available amide polymer, it is preferable to employ a manufacturing method with one reaction container in which such an amide polymer and a monomer as a starting material for an ester polymer are charged in a single reaction container to polymerize an ester polymer, and then the resultant ester polymer is block copolymerized with an amide polymer.

The manufacturing method with one reaction container is preferred especially because of the use of a reduced number of the reaction containers which leads to a reduced process time.

Such a manufacturing method with one reaction container for producing a polyester-polyamide block copolymer may, for example, be a method in which an amide polymer such as a commercially available amide polymer and a dicarboxylic acid and a diol as starting materials for an ester polymer are charged in a single reaction container and heated at 200° C. under atmospheric pressure in the presence of an esterification catalyst such as titanium tetrabutoxide in a nitrogen gas atmosphere to melt the amide polymer sufficiently, and then the stirring is continued for 10 minutes at 60 rpm at 240° C., and then the reaction system is subjected to a reduced pressure of 665 Pa or less, and reacted for 10 minutes with stirring at 60 rpm at 240° C.

A manufacturing method with two reaction containers for producing a polyester-polyamide block copolymer mentioned above may, for example, be a method in which a separately and previously polymerized amide polymer and phosphorous acid are added to a reaction container where an ester polymer has been polymerized, and heated at 250° C. under atmospheric pressure in a nitrogen gas atmosphere to melt the amide polymer sufficiently, and then the block formation reaction is continued for 10 minutes with stirring at 60 rpm at 250° C., and then the reaction system is subjected to a reduced pressure of 665 Pa or less, and reacted for 10 minutes with stirring at 60 rpm at 250° C., or a method in which after polymerizing an ester polymer, a separately and previously polymerized amide polymer and phosphorous acid are added to the same reaction container, and heated at 250° C. under atmospheric pressure in a nitrogen gas atmosphere to melt the ester polymer sufficiently, and then the block formation reaction is continued for 30 minutes with stirring at 60 rpm at 240° C., and then the reaction system is subjected to a reduced pressure of 665 Pa or less, and reacted for 30 minutes with stirring at 60 rpm at 240° C.

It is also preferred to reduce the pressure in the reaction container upon block polymerization. As a result, a low molecular weight polymer contained in an amide polymer and/or an ester polymer or a volatile polymer under reduced pressure which is generated in the reaction can be released into the outside of the system, whereby allowing the equilibration of the copolymerization reaction to shift to a point at which the polymer can readily be imparted with a higher molecular weight. Also since the polymer is difficult to be cleaved into lower molecular segments when compared with a case where the pressure is not reduced, a polymer having a higher molecular weight can be obtained. A polymer having a higher molecular weight is produced also since the lower molecular weight polymer and the volatile polymer under reduced pressure which has been generated in the reaction can be released into the outside of the system in response to the reduction in the pressure.

The reaction temperature in the block polymerization mentioned above should be a temperature not lower than the melting point of the amide polymer. While the temperature of the reaction system is preferably high for the purpose of proceeding the copolymerization reaction for the block formation smoothly by means of melting the amide polymer uniformly, it becomes difficult here to control the reaction whereby allowing randomization, thermal deterioration and coloration to occur easily. Accordingly, it is preferable for the purpose of controlling the reaction and preventing the thermal deterioration and the coloration that the temperature of the reaction system is maintained once at a temperature not lower than the melting point of the amide polymer to ensure a sufficient melting of the amide polymer followed by the reduction in the temperature of the reaction system to an extent which does not allow the crystal to be precipitated at which temperature the reaction is further continued.

The reaction temperature of the block polymerization mentioned above is preferably 220 to 270° C. The reaction temperature less than 220° C. leads to an insufficient reactivity, while that exceeding 270° C. leads to a tendency of the thermal deterioration or the coloration.

A method for mixing upon the block polymerization is not particularly restricted and may, for example, be a mixing by melting, heat kneading, dissolving in a solvent and the like. Among those listed above, the mixing by melting is employed preferably since it allows the reaction of the resultant polyester-polyamide block copolymer to be controlled easily.

The ninth present invention is a resin composition for toner which comprises, as a major component, a non-crystalline polyester having a glass transition point of 50 to 80° C. and contains a polyester block copolymer having a weight mean molecular weight of 20,000 to 200,000 comprises a crystalline polyester segment having a melting point of 140 to 280° C. and a non-crystalline polyester segment having a glass transition point of 30 to 80° C.

A polyester block copolymer employed in the ninth present invention is similar to that employed in the second present invention. However, the weight mean molecular weight (Mw) of the polyester block copolymer here is 20,000 to 200,000. The weight mean molecular weight less than 20,000 leads to a difficulty in obtaining a sufficient high temperature offset resistance, while that exceeding 200,000 leads to a poor low temperature fixation performance. More preferably, the weight mean molecular weight is 30,000 to 150,000.

The resin composition for toner according to the ninth present invention comprises, as a major component, a non-crystalline polyester having a glass transition point of 50 to 80° C. (hereinafter referred to as a non-crystalline polyester). The glass transition point less than 50° C. leads to a difficulty in obtaining sufficient high temperature offset resistance or anti-blocking performance, while that exceeding 80° C. leads to a substantial reduction in the low temperature fixation performance. Preferably, the glass transition point is 55 to 65° C.

The non-crystalline polyester can be polymerized using a dicarboxylic acid and a diol similar to those employed for a non-crystalline polyester segment mentioned above.

The molecular weight of the non-crystalline polyester described above is preferably 5,000 to 20,000.

In the resin composition for toner according to the ninth present invention, it is preferred that the non-crystalline polyester segment having a glass transition point of 30 to 80° C. in the polyester block copolymer and the non-crystalline polyester having a glass transition point of 50 to 80° C. are compatible with each other. The compatibility of the resins leads to a colorless transparent resin, which can be used satisfactorily as a resin composition for color toner capable of developing a satisfactory color, and it also provides a high resin strength which is desirable in a resin composition for toner having an excellent high temperature offset resistance.

The compatibility mentioned above means a condition in which a non-crystalline polyester segment having a glass transition point of 30 to 80° C. in the polyester block copolymer and a non-crystalline polyester having a glass transition point of 50 to 80° C. are miscible with each other uniformly, including a complete compatibility or a partial compatibility.

In the resin composition for toner according to the ninth present invention, it is preferable that at least 50% by weight of compositions of the polyester component in the polyester block copolymer and the non-crystalline polyester having a glass transition point of 50 to 80° C. are identical. The identical composition gives an improved compatibility between the polyester block copolymer and the non-crystalline polyester. The amount less than 50% by weight leads to a marked deterioration of the compatibility, resulting in a poor offset resistance. More preferably, the amount is 60% by weight or more, especially 80% by weight or more.

In the resin composition for toner according to the ninth present invention, it is preferable that the non-crystalline polyester is contained in an amount of 50% or more based on a polyester block copolymer described above. The amount less than 50% by weight may lead to a poor low temperature fixation performance. More preferably, the amount is 70% by weight or more.

The resin composition for toner according to the ninth present invention may further contain a low melting point crystalline polyester having a melting point of 50 to 120° C. The melting point less than 50° C. may lead to a poor anti-blocking performance, while the melting point exceeding 120° C. may lead to an insufficient ability of improving the low temperature fixation performance.

The resin containing such a low melting point crystalline polyester may, for example, be a polyester block copolymer comprises a high melting point crystalline polyester segment, a non-crystalline polyester segment having a glass transition point of 30 to 80° C. and a low melting point crystalline polyester segment, or a polyester block copolymer obtained by copolymerizing a non-crystalline polyester having a glass transition point of 50 to 80° C. with a low melting point crystalline polyester segment, or a resin mixture containing a low melting point crystalline polyester.

In a polyester block copolymer comprises the high melting point crystalline polyester segment, the non-crystalline polyester segment having a glass transition point of 30 to 80° C. and the low melting point crystalline polyester segment mentioned above, it is preferable that the low melting point crystalline polyester segment contained in the polyester block copolymer is present in an amount of 20% by weight or less, and 3 to 70% by weight of the high melting point crystalline polyester segment and 97 to 30% by weight of the non-crystalline polyester segment are present based on 100% by weight as the total weight of the high melting point crystalline polyester segment and the non-crystalline polyester segment, and it is more preferable that 3 to 70% by weight of the high melting point crystalline polyester segment, 0.5 to 20% by weight of the low melting point crystalline polyester segment and 96.5 to 10% by weight of the non-crystalline polyester segment are present.

The resin composition for toner according to the ninth present invention is produced by mixing a polyester block copolymer mentioned above and a non-crystalline polyester d mentioned above. A method for the mixing may, for example, be a stirring in a reaction chamber, or a melt kneading using an extruder or kneader. In order to allowing the toner performances such as a low temperature fixation performance and a high temperature offset resistance to be exerted sufficiently, it is significant to mix the polyester block copolymer with the non-crystalline polyester uniformly. The mixing may be performed simultaneously with the toner production.

In a method employing the reaction chamber for the mixing, the stirring is effected preferably at a temperature of 160° C. to 270° C. The temperature less than 160° C. may lead to a difficulty in accomplishing a uniform mixing, while one exceeding 270° C. allows the thermal deterioration or coloration to occur easily. More preferably, the temperature is 180° C. to 240° C. It is also preferable to add a phosphorus-based compound mentioned above for preventing the ester exchange reaction which proceeds simultaneously.

In a method employing a melt kneading, a kneading device may be an extruder such as a similarly rotating twin-screw extruder or a contrarily rotating twin-screw extruder, or a kneader or mixer such as banbury mixer, planetary gear, transfer mix, plastgraph, open roll continuous extruder, ko-kneader and the like. A device suitable especially for a uniform kneading may, for example, be a similarly rotating twin-screw extruder or a special single-screw extruder (for example, BUSS ko-kneader (BUSS KKG4.6-7, KO-KNEADER Plant)). In order to ensure a sufficient kneading time when employing a twin-screw extruder, L/D is preferably 35-55, more preferably 45-55. Also for the purpose of effecting a uniform kneading, a screw dimension system employing a large number of the kneading discs at an early stage to ensure a sufficient melting of the polyester block copolymer mentioned above or the polyester-polyamide block copolymer mentioned above, which are subsequently kneaded sufficiently with the non-crystalline polyester mentioned above. In such a case, the kneading temperature is preferably 120° C. to 270° C. The temperature less than 120° C. may lead to a difficulty in kneading uniformly, while that exceeding 270° C. may lead to a tendency of the thermal deterioration and the coloration. More preferably, the temperature is 140° C. to 240° C. A higher kneading temperature is preferable for the purpose of melting the block polymer mentioned above, while a lower kneading temperature is preferable for the purpose of increasing the viscosity of a polymer to be kneaded and kneading more uniformly.

The tenth present invention is a resin composition for toner which comprises, as a major component, a non-crystalline polyester having a glass transition point of 50 to 80° C. and containing a polyester block copolymer having a weight mean molecular weight of 20,000 to 200,000 comprising a crystalline polyester segment having a melting point of 140 to 280° C. and a non-crystalline polyester segment having a glass transition point of −70° C. or higher and lower than 30° C. Since the polyester block copolymer employed in the resin composition for toner according to the tenth present invention has a rubber elasticity, it serves to increase the resin strength when mixed with a non-crystalline polyester mentioned above whereby reducing the tendency of filming.

A polyester block copolymer employed in the tenth present invention is similar to that employed in the second present invention. However, the weight mean molecular weight (Mw) of the polyester block copolymer here is 20,000 to 200,000. The weight mean molecular weight less than 20,000 leads to a difficulty in obtaining a sufficient high temperature offset resistance, while that exceeding 200,000 leads to a poor low temperature fixation performance. More preferably, the weight mean molecular weight is 30,000 to 150,000. The glass transition point of the non-crystalline polyester segment is −70° C. or higher and lower than 30° C. The glass transition point less than −70° C. poses a difficulty in synthesizing a polyester block copolymer, while that of 30° C. or higher may lead to a difficulty in obtaining a sufficient anti-filming ability.

When mixing a polyester block copolymer mentioned above with a non-crystalline polyester, it is preferable to add a polyester, 30% or more of which is constituted by the composition identical to that of the polyester block copolymer which is a polyester having a weight mean molecular weight of 10 to 90% of that of the polyester block copolymer and having a viscosity intermediate between those of the polyester block copolymer and the non-crystalline polyester (hereinafter sometimes referred to as an intermediate viscosity polyester). As a result, the compatibility between the polyester block copolymer and the non-crystalline polyester is improved.

Such an intermediate viscosity polyester is not particularly restricted as long as it fulfills the requirement mentioned above, and may, for example, be a polyester block copolymer or a non-crystalline polyester. An identity of the composition less than 30% between the composition of the intermediate viscosity polyester and the polyester block copolymer gives an extremely poor compatibility, which may lead to a reduced high temperature offset resistance. More preferably, the identity is 40% or more, more preferably 60% or more. As used herein, the composition of the polyester means its starting monomers, i.e., a dicarboxylic acid and a diol. The weight mean molecular weight less than 10% based on the weight mean molecular weight of the polyester block copolymer may lead to a difficulty in achieving a sufficient mixing due to a substantial difference in the viscosity from the polyester block copolymer, while that exceeding 90% may lead to a difficulty in achieving a sufficient mixing due to a substantial difference in the viscosity from the non-crystalline polyester.

The amount of the intermediate viscosity polyester to be added is preferably 1 to 50% by weight based on the total weight of a polyester block copolymer and a non-crystalline polyester. The amount less than 1% by weight may lead to a difficulty in obtaining an effect of such an addition, while the amount exceeding 50% by weight leads to a reduced ratio of the non-crystalline polyester, which may affect the fixation adversely. More preferably, the amount is 5 to 40% by weight, especially 5 to 30% by weight.

In resin composition for toner according to the tenth present invention, it is preferred that the non-crystalline polyester segment having a glass transition point of −70° C. or higher and lower than 30° C. in the polyester block copolymer and the non-crystalline polyester having a glass transition point of 50 to 80° C. are compatible with each other. The compatibility of the resins leads to a colorless transparent resin, which can be used satisfactorily as a resin composition for color toner capable of developing a satisfactory color, and it also provides a high resin strength which is desirable in a resin composition for toner having an excellent high temperature offset resistance.

In the resin composition for toner according to the tenth present invention, the non-crystalline polyester segment having a glass transition point of −70° C. or higher and lower than 30° C. in the polyester block copolymer and the non-crystalline polyester having a glass transition point of 50 to 80° C. preferably contain at least identical dicarboxylic acid and diol. As a result, a satisfactory compatibility between the non-crystalline polyester segment having a glass transition point of −70° C. or higher and lower than 30° C. in the polyester block copolymer and a non-crystalline polyester having a glass transition point of 50 to 80° C. can be achieved. More preferably, each 80% by weight or more of an identical composition is contained.

The resin composition for toner according to the tenth present invention is produced by mixing the polyester block copolymer mentioned above and the non-crystalline polyester mentioned above. A method for the mixing may be similar to that for the resin composition for toner according to the ninth present invention.

The eleventh present invention is a resin composition for toner which comprises, as a major component, a non-crystalline polyester having a glass transition point of 50 to 80° C. and contains a polyester-polyamide block copolymer having a weight mean molecular weight of 20,000 to 200,000 comprising a crystalline polyamide segment having a melting point of 140 to 280° C. and a non-crystalline polyester segment having a glass transition point of 30 to 80° C. and/or a crystalline polyester segment having a melting point of 50 to 120° C.

The polyester-polyamide block copolymer employed in the eleventh present invention is similar to that employed in the fifth, sixth or seventh present invention. However, the weight mean molecular weight (Mw) of the polyester-polyamide block copolymer here is 20,000 to 200,000. The weight mean molecular weight less than 20,000 leads to a difficulty in obtaining a sufficient high temperature offset resistance, while that exceeding 200,000 leads to a poor low temperature fixation performance. More preferably, the weight mean molecular weight is 30,000 to 150,000.

The resin composition for toner according to the eleventh present invention contains, as a major component, a non-crystalline polyester having s glass transition point of 50 to 80° C. The glass transition point less than 50° C. leads to a difficulty in obtaining sufficient high temperature offset resistance or anti-blocking performance, while that exceeding 80° C. leads to a substantial reduction in the low temperature fixation performance. Preferably, the glass transition point is 55 to 65° C. The non-crystalline polyester can be polymerized using a dicarboxylic acid and a diol similar to those employed for a non-crystalline polyester segment mentioned above.

The molecular weight of the non-crystalline polyester mentioned above is preferably 5,000 to 20,000.

In the resin composition for toner according to the eleventh present invention, it is preferred that the non-crystalline polyester segment having a glass transition point of 30 to 80° C. in the polyester-polyamide block copolymer and the non-crystalline polyester having a glass transition point of 50 to 80° C. are compatible with each other. The compatibility of the resins leads to a colorless transparent resin, which can be used satisfactorily as a resin composition for color toner capable of developing a satisfactory color, and it also provides a high resin strength which is desirable in a resin composition for toner having an excellent high temperature offset resistance.

In the resin composition for toner according to the eleventh present invention, it is preferable that at least 30% by weight of compositions of the polyester component in the polyester-polyamide block copolymer and the non-crystalline polyester having a glass transition point of 50 to 80° C. are identical. The identical composition gives an improved compatibility between the polyester-polyamide block copolymer and the non-crystalline polyester. The amount less than 30% by weight leads to a marked deterioration of the compatibility, resulting in a poor offset resistance. More preferably, the amount is 40% by weight or more, especially 50% by weight or more.

In the resin composition for toner according to the eleventh present invention, it is preferable that the non-crystalline polyester having a glass transition point of 50 to 80° C. is contained in an amount of 50% or more based on the polyester-polyamide block copolymer mentioned above, more preferably 70% by weight or more. The amount of 80% by weight or more and not higher than 97% by weight is especially preferred. The amount less than 50% by weight may lead to a poor low temperature fixation performance.

The resin composition for toner according to the eleventh present invention may further contain a low melting point crystalline polyester having a melting point of 50 to 120° C. The melting point less than 50° C. may lead to a poor anti-blocking performance, while the melting point exceeding 120° C. may lead to an insufficient ability of improving the low temperature fixation performance.

The amount of a low melting point crystalline polyester is preferably 20% by weight or less based on the resin composition for toner for the purpose of preventing any filming.

The low melting point crystalline polyester is preferably derived from an aliphatic polyester polymer or an alicyclic polyester polymer, such as one produced by DAINIPPON INK AND CHEMICALS, INCORPORATED (ODX2550).

A resin containing such a low melting point crystalline polyester may, for example, be a polyester-polyamide block copolymer comprising a non-crystalline polyester segment having a glass transition point of 30 to 80° C. and/or a crystalline polyester segment having a melting point of 50 to 120° C., a polyamide segment and a low melting point crystalline polyester segment, or a polyester block copolymer obtained by copolymerizing a non-crystalline polyester having a glass transition point of 50 to 80° C. with a low melting point crystalline polyester segment, or a resin mixture containing a low melting point crystalline polyester.

In a polyester block copolymer comprising the non-crystalline polyester segment having a glass transition point of 30 to 80° C. and/or the crystalline polyester segment having a melting point of 50 to 120° C., the crystalline polyamide segment and a low melting point crystalline polyester segment mentioned above, it is preferable that the low melting point crystalline polyester segment contained in the polyester-polyamide block copolymer is present in an amount of 20% by weight or less, and 3 to 70% by weight of the polyamide segment and 97 to 30% by weight of the polyester segment are present based on 100% by weight as the total weight of the polyamide segment and the polyester segment mentioned above, and it is more preferable that 3 to 70% by weight of the polyamide segment, 0.5 to 20% by weight of the low melting point crystalline polyester segment and 96.5 to 10% by weight of the polyester segment mentioned above are present.

The resin composition for toner according to the eleventh present invention is produced by mixing a polyester-polyamide block copolymer mentioned above and a non-crystalline polyester mentioned above. A method for the mixing may be similar to that for the resin composition for toner according to the ninth present invention.

The twelfth present invention is a resin composition for toner which comprises, as a major component, a non-crystalline polyester having a glass transition point of 50 to 80° C. and contains a polyester-polyamide block copolymer having a weight mean molecular weight of 20,000 to 200,000 comprising a polyamide segment having a melting point of 140 to 280° C. and a non-crystalline polyester segment having a glass transition point of −70° C. or higher and lower than 30° C. Since the polyester-polyamide block copolymer employed in the resin composition for toner according to the twelfth present invention has a rubber elasticity, it serves to increase the resin strength when mixed with the non-crystalline polyester mentioned above whereby reducing the tendency of filming.

A polyester block copolymer employed in the twelfth present invention is similar to that employed in the fifth, sixth or seventh present invention. However, the weight mean molecular weight (Mw) of the polyester block copolymer here is 20,000 to 200,000. The molecular weight less than 20,000 leads to a difficulty in obtaining a sufficient high temperature offset resistance, while that exceeding 200,000 leads to a poor low temperature fixation performance. More preferably, the weight mean molecular weight is 30,000 to 150,000. The glass transition point of the non-crystalline polyester segment is −70° C. or higher and lower than 30° C. The glass transition point less than −70° C. poses a difficulty in synthesizing a polyester-polyamide block copolymer, while that of 30° C. or higher may lead to a difficulty in obtaining a sufficient anti-filming ability.

In the resin composition for toner according to the twelfth present invention, it is preferred that the non-crystalline polyester segment having a glass transition point of −70° C. or higher and lower than 30° C. in the polyester-polyamide block copolymer and the non-crystalline polyester having a glass transition point of 50 to 80° C. are compatible with each other. The compatibility of the resins leads to a colorless transparent resin, which can be used satisfactorily as a resin composition for color toner capable of developing a satisfactory color, and it also provides a high resin strength which is desirable in a resin composition for toner having an excellent high temperature offset resistance.

In the resin composition for toner according to the twelfth present invention, a non-crystalline polyester segment having a glass transition point of −70° C. or higher and lower than 30° C. in the polyester-polyamide block copolymer and a non-crystalline polyester having a glass transition point of 50 to 80° C. preferably contain at least identical dicarboxylic acid and diol. As a result, a satisfactory compatibility between the non-crystalline polyester segment having a glass transition point of −70° C. or higher and lower than 30° C. in the polyester-polyamide block copolymer and a non-crystalline polyester having a glass transition point of 50 to 80° C. can be achieved. More preferably, each 80% by weight or more of an identical composition is contained.

The resin composition for toner according to the twelfth present invention is produced by mixing the polyester-polyamide block copolymer mentioned above and the non-crystalline polyester mentioned above. A method for the mixing may be similar to that for the resin composition for toner according to the ninth present invention.

The thirteenth present invention is a resin composition for toner which has a storage modulus G depicted in Pa unit, when subjected to a dynamic viscoelasticity test under a condition involving a frequent of 15.92 Hz, a strain of 1%, a temperature of 60 to 300° C. and a temperature elevation rate of 10° C./minute, fulfilling either of the requirement (a), (b) or (c):

(a) when X is assumed to be a constant value selected from an actual number of 1 or more and less than 10, then the range of the temperature fulfilling the requirement defined by the following formula (1) is present over at least 20° C. or more;

(b) when X is assumed to be a constant value selected from an actual number of 1 or more and less than 10, then the range of the temperature fulfilling the requirement defined by the following formula (2) is present over at least 20° C. or more;

(c) when X is assumed to be a constant value selected from an actual number of 1 or more and less than 10, then the range of the temperature fulfilling the requirement defined by the following formula (3) is present over at least 20° C. or more;

$$G=(X\pm0.5)\times10^3 \quad (1)$$

wherein X is a constant value selected from an actual number of 1 or more and less than 10;

$$G=(X\pm0.5)\times10^4 \quad (2)$$

wherein X is a constant value selected from an actual number of 1 or more and less than 10;

$$G=(X\pm0.5)\times10^5 \quad (3)$$

wherein X is a constant value selected from an actual number of 1 or more and less than 10.

By using a resin composition for toner fulfilling the requirement of the viscoelasticity specified above, a toner fulfilling the requirements of a low temperature fixation performance, a high temperature offset resistance and an anti-blocking performance at the same time and exhibiting a satisfactory fixation performance over a wide range of the temperature can be obtained.

The fourteenth present invention is a resin composition for toner, comprising, as a major component, a polyester block copolymer comprising a crystalline polyester segment and a non-crystalline polyester segment, wherein said polyester block copolymer has a blocking rate of 10 to 100%, said blocking rate being defined as ((Sb/Sa)×100), when subjected to the procedure: in which a crystalline polyester resin having a weight mean molecular weight of 10,000 and having an identical composition to that of said crystalline polyester segment is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then heated again at the temperature elevating rate of 10° C./minute to measure the differential calorie of the crystalline polyester resin, then the endothermic calorie (Sa) of the crystal melting endothermic peak per unit resin weight of the crystalline polyester resin is calculated from the peak area of the crystal melting endothermic peak, and then said polyester block copolymer is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then measured again the differential calorie of the polyester block copolymer at the temperature elevating rate of 10° C./minute, while the resin weight of the crystalline polyester segment in said copolymer is calculated from the resin weight of the polyester block copolymer used in the measurement then the endothermic calorie (Sb) of the crystal melting endothermic peak per unit resin weight of the crystalline polyester segment is calculated from the crystal melting endothermic peak area of the crystal part of said copolymer. These measured values of the viscoelasticity can be determined even when using a toner similarly to the measurement of a resin composition for toner.

When producing a polyester block copolymer by a block polymerization, the polymer tends to be cleaved into shorter segments under the condition of the block polymerization because of the effect of an esterification reaction catalyst remaining in the starting polymer. Also upon the melt kneading of the resultant polyester block copolymer, the block may further be cleaved into the shorter segments because of the repeating decomposition and re-binding. Since the conversion of the block into the shorter segments leads to a deterioration of the performance of the block copolymer, it is preferable that the block remains without being cleaved into the shorter segments.

The blocking rate mentioned above is an index showing the extent to which the starting polymer remains in of the block copolymer without being cleaved into shorter segments. Thus, when the blocking rate is 100%, then the polymer employed as a starting material has not been cleaved into the shorter segments at all.

While the weight mean molecular weight of a crystalline polyester resin used as a standard is preferably similar to the weight mean molecular weight of a polyester block copolymer to be measured, a crystalline polyester having a weight mean molecular weight of 10,000 which can be handled conveniently is selected as a standard since the difference in the endothermic calorie of the crystalline melting peak by the difference in the weight mean molecular weight is not so significant.

The fifteenth present invention may, for example, be a resin composition for toner, comprising, as a major component, a polyester-polyamide block copolymer comprising a crystalline polyamide segment and a non-crystalline polyester segment, wherein said polyester-polyamide block copolymer has a blocking rate of 10 to 100%, said blocking rate being defined as ((Sb/Sa)×100), when subjected to the procedure: in which a crystalline polyamide resin having a weight mean molecular weight of 10,000 and having an identical composition to that of said crystalline polyamide segment is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then heated again at the temperature elevating rate of 10° C./minute to measure the differential calorie of the crystalline polyamide resin, then the endothermic calorie (Sa) of the crystal melting endothermic peak per unit resin weight of the crystalline polyamide resin is calculated from the peak area of the crystal melting endothermic peak, and then said polyester-polyamide block copolymer is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then measured again the differential calorie of the polyester-polyamide block copolymer at the temperature elevating rate of 10° C./minute, while the resin weight of the crystalline polyamide segment in said copolymer is calculated from the resin weight of the polyester-polyamide block copolymer used in the measurement then the endothermic calorie (Sb) of the crystal melting endothermic peak per unit resin weight of the crystalline polyamide segment is calculated from the crystal melting endothermic peak area of the crystal part of said copolymer.

When producing a polyester-polyamide block copolymer by a block polymerization, the polymer tends to be cleaved into shorter segments under the condition of the block polymerization because of the effect of a catalyst remaining in the starting polymer. Also upon the melt kneading of the resultant polyester-polyamide block copolymer, the block may further be cleaved into the shorter segments because of the repeating decomposition and re-binding. Since the conversion of the block into the shorter segments leads to a deterioration of the performance of the block copolymer, it is preferable that the block remains without being cleaved into the shorter segments.

The blocking rate mentioned above is an index showing the extent to which the starting polymer remains in the block copolymer without being cleaved into shorter segments. Thus, when the blocking rate is 100%, then the polymer employed as a starting material has not been cleaved into the shorter segments at all.

While the weight mean molecular weight of a crystalline polyamide resin used as a standard is preferably similar to the weight mean molecular weight of a polyester-polyamide block copolymer to be measured, a crystalline polyamide resin having a weight mean molecular weight of 10,000 which can be handled conveniently is selected as a standard since the difference in the endothermic calorie of the crystalline melting peak by the difference in the weight mean molecular weight is not so significant.

In the resin composition for toner according to first, second, third, fourth, fifth, sixth, seventh, eighth, ninth, tenth, eleventh, twelfth, thirteenth, fourteenth or fifteenth present invention, it is preferable that a polymer component having a molecular weight measured by a gel permeation chromatography of 106 or more is contained in an amount of 5% by weight or less. Preferably the amount is 1% by weight or less, more preferably 0% by weight. The amount of a polymer component having a molecular weight specified above of $10^6$ or higher can be calculated from the area rate of the partial integral value corresponding to the molecular weight of $10^6$ or higher based on the total integral value of the polymer in the polymer molecular weight measurement curve.

The GPC measurement method mentioned above is not particularly restricted and may, for example, be a method in which HTR-C (produced by Nihon Millipore Ltd.) as a GPC measurement device together with HFIP-806 M (two units) (produced by SHOWA DENKO K.K.) as columns attached in tandem under the conditions involving the temperature of 40° C., 0.1% by weight sample solution (filtered through 0.45 μm membrane), injection volume of 100 μL, 0.68 g/L sodium trifluoroacetate (TFA) in hydroxyfluoroisopropanol as a carrier solvent and a standard polystyrene as a correction sample.

A solvent used for dissolving an inventive resin composition for toner in a GPC measurement may be selected appropriately depending on the formulation of the resin composition for toner, and may, for example, be hydroxyfluoroisopropanol, tetrahydrofuran, chloroform and the like.

The sixteenth present invention is a toner obtained by using a resin composition for toner according to the first, second, third, fourth, fifth, sixth, seventh, eighth, ninth, tenth, eleventh, twelfth, thirteenth, fourteenth or fifteenth present invention. An toner according to the present invention can be produced using an inventive resin composition for toner as a binder resin by mixing if necessary with a releasing agent, colorant, electric charge controller, magnetic substance, rubber polymer, styrene-acrylate copolymer-derived resin composition for toner, carrier and cleaning performance-improving agent and the like.

Since the toner according to the sixteenth present invention exhibits the excellence with regard to the both of the low temperature fixation performance and the high temperature offset resistance because of the use of the resin composition for toner according to the present invention, it may not contain a releasing agent. When the toner according to the present invention contains no releasing agent, it is a toner having a further improved transparency.

Such a releasing agent may, for example, be an olefin wax or a paraffin wax such as polypropylene wax, polyethylene wax, microcrystalline wax, oxidized polyethylene wax and the like; an aliphatic ester-based wax such as carnauba wax, sasol wax, montan acid ester wax and the like; deacidified carnauba wax; a saturated aliphatic acid-based wax such as palmitic acid, stearic acid, montan acid and the like; an unsaturated aliphatic acid-based wax such as brassidic acid, eleostearic acid, parinaric acid and the like; a saturated alcohol-based wax or an aliphatic alcohol-based wax such as stearyl alcohol, aralkyl alcohol, behenyl alcohol, carnaubyl alcohol, ceryl alcohol, mericyl alcohol and the like; a polyhydric alcohol-based wax such as sorbitol; a saturated fatty acid amide-based wax such as linolic acid amide, oleic acid amide, lauric acid amide and the like; a saturated fatty acid bisamide-based wax such as methylenebisstearic acid amide, ethylenebiscapric acid amide, ethylenebislauric acid amide, hexamethylenebisstearic acid amide and the like; an unsaturated acid amide-based wax such as ethylenebisoleic acid amide, hexamethylenebisoleic acid amide, N,N'-dioleyladipic acid amide, N,N'-dioleysebacic acid amide and the like; an aromatic bisamide-based wax such as m-xylenebisstearic acid amide, N,N'-distearylisophthalic acid amide and the like; a fatty acid metal salt such as calcium stearate, calcium laurate, zinc stearate, magnesium stearate and the like; a graft-modified wax obtained by graft polymerizing a polyolefin with a vinylic monomer such as styrene or acrylic acid; a partial ester wax obtained by reacting a fatty acid and a polyhydric alcohol such as monoglyceride behenate; a hydroxyl group-carrying methyl ester wax obtained by hydrogenating a vegetable oil; an ethylene-vinyl acetate copolymer wax having a high ethylene content; a long chain alkyl acrylate wax such as a stearyl acrylate wax of acrylic acid and the like; an aromatic acrylate wax such as benzyl acrylate wax. Among those listed above, a long chain alkyl acrylate wax or an aromatic acrylate wax is preferable since it is highly compatible with a resin composition for toner and gives a highly transparent toner.

The colorant mentioned above may, for example, be a carbon black such as furnace black, lamp black, thermal black, acetylene black, channel black and the like, aniline black, phthalocyanine blue, quinoline yellow, lamp black, rhodamine-B, azo-based pigment, perylene-based pigment, perynone-based pigment, anthraquinone-based pigment, dioxazine-based pigment, isoindoline-based pigment, isoindolinone-based pigment, thren-based pigment, indigo-based pigment, quinophthalone, diketopyrrolopyrrole, quinacridone and the like.

Generally, the amount of such a colorant to be added is preferably 1 to 10 parts by weight based on 100 parts by weight of a resin composition for toner.

The electric charge controlling agent mentioned above may be any of the two types, namely, positive charge controller and negative charge controller. Such a positive charge controlling agent may, for example, be a nigrosine dye, ammonium salt, pyridinium salt, azine and the like, while a negative charge controlling agent may, for example, be a chromium complex, iron complex and the like. Among those listed above, an acid-modified electric charge controlling agent is preferred, and it exhibits a rubber elasticity as a result of the crosslinking with a resin composition for toner when it is modified with salicylic acid.

The metal complex of an alkyl-substituted salicylic acid such as di-tert-butylsalicylic acid chromium complex and di-tert-butylsalicylic acid zinc complex is preferred since it is colorless or has a pale color which does not affect the toner color tone.

Generally, the amount of such an electric charge controlling agent to be added is preferably 0.1 to 10 parts by weight based on 100 parts by weight of a resin composition for toner.

The magnetic substance mentioned above may, for example, be a trade name "TAROX BL series" (produced by TITAN KOGYO KABUSHIKI KAISHA), a trade name "EPT series", a trade name "MAT series", a trade name "MTS series" (produced by TODA KOGYO CORP.), a trade name "DCM series" (produced by DOWA IRON POWDER CO., LTD), a trade name "KBC series", a trade name "KBI series", a trade name "KBF series", a trade name "KBP series" (produced by KANTO DENKA KOGYO CO., LTD.), a trade name "Bayoxide E series" (produced by Bayer AG) and the like.

The rubber polymer mentioned above may, for example, be a natural rubber, a synthetic rubber such as polyisoprene rubber, polybutadiene rubber, nitrile rubber (acrylonitrile-butadiene copolymer), chloroprene rubber, butyl rubber, acrylic rubber, polyurethane elastomer, silicone rubber, ethylene-propylene copolymer, ethylene-propylene-diene copolymer, chlorosulfinated polyethylene, ethylene vinyl acetate copolymer, ethylene-acrylic copolymer, ethylene-acrylate copolymer, chlorinated polyethylene, epichlorohydrin rubber, nitrile isoprene rubber and the like, an elastomer such as polyester elastomer, urethane elastomer and the like, a block copolymer of an aromatic hydrocarbon with a conjugated diene-based hydrocarbon such as styrene-butadiene-styrene block copolymer, styrene-isoprene-styrene block copolymer, styrene-ethylenebutylene-styrene block copolymer, styrene-ethylenepropylene-styrene block copolymer and the like. In a block copolymer, a styrene-butadien block copolymer or a styrene-isoprene block copolymer may be mixed in, as well as a hydrogenated derivative thereof.

A rubber polymer comprising an aromatic hydrocarbon having a polar group such as a hydroxyl group, carboxyl group, aldehyde group, sulfonyl group, cyano group, nitro group, halogen group and the like at its terminal and a conjugated diene block copolymer is preferable since it exhibits an excellent affinity with a toner. Such a block copolymer having a terminal polar group can be obtained by a living polymerization.

A rubber polymer can improve the resin strength of the resin contained in a toner. Accordingly, a toner containing a rubber polymer can prevent the filming phenomenon of the toner, and gives a toner suitable as a non-magnetic single-component toner which should have a high resin strength.

The carrier mentioned above may, for example, be a metal element, alloy, oxide of iron, nickel, copper, zinc, cobalt, manganese, chromium, rare-earth metal and the like as well as ferrite. The carrier may have an oxidized surface. The surface of a carrier may be coated with a polytetrafluoroethylene, monochlorotrifluoroethylene polymer, polyvinylidene fluoride, silicone polymer, polyester, di-tert-butylsalicylic acid metal complex, styrene polymer, acrylic polymer, polyamide, polyvinyl butyral, nigrosine basic dye, silica powder, alumina powder and the like. By coating the carrier, a preferable frictional electrificating ability can be imparted to the carrier.

The cleaning performance-improving agent mentioned above is not particularly restricted as long as it can improve the fluidity of the toner when it is mixed with the toner. An increased fluidity of the toner serves to prevent the deposition of the toner on a cleaning blade. Those which may be exemplified are fluorine-based polymer powder such as vinylidene fluoride polymer, acrylic polymer powder such as acrylate polymer, a fatty acid metal salt powder such as zinc stearate, calcium stearate, lead stearate and the like, a metal oxide powder such as zinc oxide powder, titanium oxide powder and the like, microparticulate silica powder, a silica powder whose surface has been treated with a silane coupling agent or titanium coupling agent or a silicone oil, a fumed silica and the like.

Since the toner according to the sixteenth present invention is formed by employing the resin composition for toner according to the present invention composition, it can exhibits a satisfactory fixation performance over a wide range from a low temperature to a high temperature, whereby allowing a toner exhibiting the excellence with regard to the all of the low temperature fixation performance, high temperature offset resistance and anti-blocking performance. As a result, it can reduce the time period required for enabling the printing after the power is on, whereby providing an economical advantage, and it can also increase the speed of the printing because of its ability of maintaining the sharpness of an image even after the temperature of a roller is reduced. Since the resin composition for toner according to the present invention is colorless and transparent, it allows the color to be adjusted to any desired color.

While the toner according to the present invention may be fixed by a fixation roller coated with a release oil, it can exhibit a satisfactory fixation performance even when no release oil is coated on the fixation roller.

While the toner according to the present invention may be crosslinked, or may contain other resin composition for toner than a polyester block copolymer or polyester-polyamide block copolymer, it can exhibits a satisfactory fixation performance over a wide range from a low temperature to a high temperature even when it is not crosslinked or when it contains no high molecular weight resin. Accordingly, a toner exhibiting the excellence with regard to the all of the low temperature fixation performance, high temperature offset resistance and anti-blocking performance can be obtained even with a resin composition for toner which is not crosslinked or contains no high molecular weight resin and whose molecular weight distribution is a mono-distribution. Especially since it is a non-crosslinked resin composition for toner whose molecular weight distribution is a mono-distribution, it allows a toner capable of being ground more readily when compared with a toner employing a resin composition for toner containing a high molecular weight resin, and exhibits a more sharp melting profile when compared with a resin composition for toner containing a high molecular weight resin, whereby giving a glossy fixed image.

BEST MODES FOR CARRYING OUT THE INVENTION

The present invention is further detailed in the following examples which are not intended to restrict the present invention.

EXAMPLE 1

(1) Production of High Melting Point Crystalline Polyester Polymer

A 60 L reaction container was fitted with a distillation tower, a water separator, a nitrogen gas inlet tube, a thermometer and a stirrer in an ordinary manner, and charged in a nitrogen gas atmosphere with 100 moles of terephthalic acid as a dicarboxylic acid component and 68 moles of 1,4-cyclohexanedimethanol and 52 moles of ethylene glycol as diol components and 0.05 moles of titanium tetrabutoxide (TTB) as an esterification condensation catalyst, which were subjected to an esterification reaction while distilling the generated water and methanol off via the distillation tower at 220° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened, whereby reducing the pressure of the reaction system to 665 Pa or less, and conducting the condensation reaction with stirring at 60 rpm at 240° C., while the free diol generated in the condensation reaction was allowed to distilled off into the outside of the reaction system, whereby obtaining a high melting point polyester polymer.

(2) Production of Non-Crystalline Polyester Polymer

A 60 L reaction container was fitted with a distillation tower, a water separator, a nitrogen gas inlet tube, a thermometer and a stirrer in an ordinary manner, and charged in a nitrogen gas atmosphere with 90 moles of terephthalic acid as a dicarboxylic acid component, 10 moles of isophthalic acid as a bending monomer component, 90 moles of neopentyl glycol as a branched monomer component, 30 moles of ethylene glycol as an another diol component and 0.05 moles of titanium tetrabutoxide (TTB) as an esterification condensation catalyst, which were subjected to an esterification reaction while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less and conducting the condensation reaction with stirring at 60 rpm at 240° C., while the free diol generated in the condensation reaction was allowed to distilled off into the outside of the reaction system, whereby obtaining a non-crystalline polyester polymer.

(3) Production of Polyester Block Copolymer

A 60 L reaction container was fitted with a distillation tower, a water separator, a nitrogen gas inlet tube, a thermometer and a stirrer in an ordinary manner, and charged in a nitrogen gas atmosphere with 40% by weight of the high melting point crystalline polyester polymer, 60% by weight of the non-crystalline polyester polymer and 0.11 moles of phosphorous acid which corresponded to an amount slightly in excess of the equimolar amount of the total TTB employed in the productions of the crystalline polyester polymer and the non-crystalline polyester polymer, and at the time when the crystals in the reaction container were melted the system was kept at a constant temperature while the pressure of the system was reduced to 665 Pa or less to conduct the reaction with stirring at 60 rpm, and then at the time when the initially turbid molten matter in the reaction container became transparent, the reaction was terminated to obtain a polyester block copolymer. This was employed as a resin composition for toner.

(4) Production of Toner 100 parts by weight of the resin composition for toner obtained as mentioned above was combined with 1 parts by weight of a charge controller (TN-105: produced by HODOGAYA CHEMICAL CO,. LTD.) and 5 parts by weight of a magenta pigment classified into carmine 6B, and mixed thoroughly using a henshcel mixer, and then kneaded at 130° C., cooled and ground coarsely. Subsequently, this was finely divided using a jet mill (LABOJET, produced by Nippon Pneumatic Mfg. Co., Ltd.) to obtain a toner powder having a mean particle size of about 8 to 12 μm.

Then this toner powder was sieved with a sieving machine (MDS-2: produced by Nippon Pneumatic Mfg. Co., Ltd.) to obtain a toner fine powder having a mean particle size of about 10 μm. 100 parts by weight of this toner fine powder was mixed (treated externally) with 1.0 part by weight of a hydrophobic silica (R972: produced by Nippon Aerosil Co., Ltd.) to obtain a toner.

EXAMPLE 2

A polyester block copolymer was synthesized and a resin composition for toner was obtained similarly to Example 1 except that the reaction temperature and the reaction time were adjusted so that the molecular weight of the high melting point crystalline polymer became 10,000 and the molecular weight of the non-crystalline polyester polymer became 5,000 and that in the production of the polyester block copolymer the amount of the high melting point crystalline polymer was 20% by weight and the amount of the non-crystalline polyester polymer was 80% by weight. The resultant resin composition for toner was used to produce a toner similarly to Example 1.

EXAMPLE 3

A polyester block copolymer was synthesized and a resin composition for toner was obtained similarly to Example 1 except that the reaction temperature and the reaction time were adjusted so that the molecular weight of the high melting point crystalline polymer became 10,000 and the molecular weight of the non-crystalline polyester polymer became 10,000 and that in the production of the polyester block copolymer the amount of the high melting point crystalline polymer was 20% by weight and the amount of the non-crystalline polyester polymer was 80% by weight. The resultant resin composition for toner was used to produce a toner similarly to Example 1.

EXAMPLE 4

A polyester block copolymer was synthesized and a resin composition for toner was obtained similarly to Example 1 except that the reaction temperature and the reaction time were adjusted so that the molecular weight of the high melting point crystalline polymer became 3,000 and the molecular weight of the non-crystalline polyester polymer became 5,000 and that in the production of the polyester block copolymer the amount of the high melting point crystalline polymer was 20% by weight and the amount of the non-crystalline polyester polymer was 80% by weight. The resultant resin composition for toner was used to produce a toner similarly to Example 1.

EXAMPLE 5

A polyester block copolymer was synthesized and a resin composition for toner was obtained similarly to Example 1 except that the reaction temperature and the reaction time were adjusted so that the molecular weight of the high melting point crystalline polymer became 10,000 and that in the production of the polyester block copolymer the amount of the high melting point crystalline polymer was 10% by weight and the amount of the non-crystalline polyester polymer was 90% by weight. The resultant resin composition for toner was used to produce a toner similarly to Example 1.

EXAMPLE 6

A polyester block copolymer was synthesized and a resin composition for toner was obtained similarly to Example 1 except that as a high melting point crystalline polymer was obtained as described below was employed, and that in the production of the polyester block copolymer the amount of the high melting point crystalline polymer was 20% by weight and the amount of the non-crystalline polyester polymer was 80% by weight. The resultant resin composition for toner was used to produce a toner similarly to Example 1.

<Production of High Melting Point Polyester Polymer>

A 60 L reaction container was fitted with a distillation tower, a water separator, a nitrogen gas inlet tube, a thermometer and a stirrer in an ordinary manner, and charged in a nitrogen gas atmosphere with 100 moles of terephthalic acid as a dicarboxylic acid component and 120 moles of 1,4-butanediol as a diol component and 0.05 moles of titanium tetrabutoxide (TTB) as an esterification condensation catalyst, which were subjected to an esterification reaction while distilling the generated water and methanol off via the distillation tower at 220° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened, whereby reducing the pressure of the reaction system to 665 Pa or less, and conducting the condensation reaction with stirring at 60 rpm at 240° C., while the free diol generated in the condensation reaction was allowed to distilled off into the outside of the reaction system, whereby obtaining a high melting point polyester polymer.

EXAMPLE 7

A polyester block copolymer was synthesized and a resin composition for toner was obtained similarly to Example 6 except that the reaction temperature and the reaction time were adjusted so that the molecular weight of the high melting point crystalline polymer became 20,000.

The resultant resin composition for toner was used to produce a toner similarly to Example 1.

EXAMPLE 8

Using the high melting point crystalline polyester polymer prepared in Example 2, the non-crystalline polyester polymer prepared in Example 1 and POLYLITE ODX-2555 (produced by DAINIPPON INK AND CHEMICALS, INCORPORATED; melting point: 77° C.) as a low melting point crystalline polyester polymer, a polyester block copolymer was produced as described below to obtain a resin composition for toner.

The resultant resin composition for toner was used to produce a toner similarly to Example 1.

<Production of Polyester Block Copolymer>

A 60 L reaction container was fitted with a distillation tower, a water separator, a nitrogen gas inlet tube, a thermometer and a stirrer in an ordinary manner, and charged in a nitrogen gas atmosphere with 20% by weight of the high melting point crystalline polyester polymer, 10% by weight of the low melting point crystalline polyester polymer, 70% by weight of the non-crystalline polyester polymer and 0.11 moles of phosphorous acid which corresponded to an amount slightly in excess of the equimolar amount of the total TTB employed in the productions of the crystalline polyester polymer and the non-crystalline polyester polymer, and at the time when the crystals in the reaction container were melted the system was kept at a constant temperature while the pressure of the system was reduced to 665 Pa or less to conduct the reaction with stirring at 60 rpm, and then at the time when the initially turbid molten matter in the reaction container became transparent the reaction was terminated to obtain a polyester block copolymer.

EXAMPLE 9

A polyester block copolymer was synthesized and a resin composition for toner was obtained similarly to Example 8 except for using as a high melting point crystalline polyester polymer produced in Example 6, a polyester block copolymer was synthesized and a resin composition for toner was obtained.

The resultant resin composition for toner was used to produce a toner similarly to Example 1.

EXAMPLE 10

A polyester block copolymer was synthesized similarly to Example 1 except that as a high melting point crystalline polyester polymer prepared in Example 6 was employed and that in the production of the polyester block copolymer the amount of the high melting point crystalline polyester polymer was 20% by weight and the amount of the non-crystalline polyester polymer was 70% by weight.

To this polyester block copolymer, 10% by weight of a low melting point crystalline polyester polymer (POLYLITE ODX-2555, produced by DAINIPPON INK AND CHEMICALS, INCORPORATED; melting point: 77° C.) was added and the mixture was kneaded to obtain a resin composition for toner.

The resultant resin composition for toner was used to produce a toner similarly to Example 1.

EXAMPLE 11

(1) Production of Polyester-Polyamide Block Copolymer

A 60 L reaction container was fitted with a distillation tower, a water separator, a nitrogen gas inlet tube, a thermometer and a stirrer, and charged in a nitrogen gas atmosphere with 90 moles of terephthalic acid as a dicarboxylic acid component, 10 moles of isophthalic acid as a bending monomer component, 90 moles of neopentyl glycol as a branched monomer component, 30 moles of ethylene glycol as an another diol component and 0.05 moles of titanium tetrabutoxide (TTB) as an esterification condensation catalyst together with 2.56 kg of a commercially available 6-nylon having a weight mean molecular weight of 40,000 and having a melting point of 220° C. as an amide polymer. The esterification reaction was conducted while distilling the generated water and methanol off via the distillation tower at 200° C. At the time when no water and methanol was distilled off via the distillation tower, the esterification reaction was terminated. After terminating the esterification reaction, the opening of the 60 L reaction container communicating with the distillation tower was closed and the line to the vacuum pump was opened whereby reducing the pressure of the reaction system to 665 Pa or less, and the free diol generated in the condensation reaction was allowed to distilled off into the outside of the reaction system with stirring at 60 rpm at 240° C. to obtain an ester polymer while effecting the block polymerization with the 6-nylon. When the reaction was almost completed, 0.06 moles of phosphorous acid was added and the mixture was stirred for 5 minutes to obtain a polyester-polyamide block copolymer. This was employed as a resin composition for toner.

(2) Production of Toner 100 parts by weight of the resin composition for toner obtained as mentioned above was combined with 1 parts by weight of a charge controller (TN-105: produced by HODOGAYA CHEMICAL CO,. LTD.) and 5 parts by weight of a magenta pigment classified into carmine 6B, and mixed thoroughly using a henshcel mixer, and then kneaded at 130° C., cooled and ground coarsely. Subsequently, this was finely divided using a jet mill (LABOJET, produced by Nippon Pneumatic Mfg. Co., Ltd.) to obtain a toner powder having a mean particle size of about 8 to 12 μm.

Then this toner powder was sieved with a sieving machine (MDS-2: produced by Nippon Pneumatic Mfg. Co., Ltd.) to obtain a toner fine powder having a mean particle size of about 10 μm. 100 parts by weight of this toner fine powder was mixed (treated externally) with 1.0 part by weight of a hydrophobic silica (R972: produced by Nippon Aerosil Co., Ltd.) to obtain a toner.

EXAMPLE 12

(1) Production of Polyester-polyamide Block Copolymer

A 60 L reaction container was fitted with a distillation tower, a water separator, a nitrogen gas inlet tube, a thermometer and a stirrer in an ordinary manner, and charged in a nitrogen gas atmosphere with 100 moles of sebacic acid as a dicarboxylic acid component and 120 moles of ethylene glycol as a diol component and 0.05 moles of titanium tetrabutoxide (TTB) as an esterification condensation catalyst together with 2.56 kg of a commercially available 6-nylon having a weight mean molecular weight of 20,000 and having a melting point of 220° C. as an amide polymer. The esterification reaction was conducted while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less, and the free diol generated in the condensation reaction was allowed to distilled off into the outside of the reaction system with stirring at 60 rpm at 240° C. to obtain an ester polymer while effecting the block polymerization with the 6-nylon. When the reaction was almost completed, 0.06 moles of phosphorous acid was added and the mixture was stirred for 5 minutes to obtain a polyester-polyamide block copolymer. This was employed as a resin composition for toner.

(2) Production of Toner 100 parts by weight of the resin composition for toner obtained as mentioned above was combined with 1 parts by weight of a charge controller (TN-105: produced by HODOGAYA CHEMICAL CO,. LTD.) and 5 parts by weight of a magenta pigment classified into carmine 6B, and mixed thoroughly using a henshcel mixer, and then kneaded at 130° C., cooled and ground coarsely. Subsequently, this was finely divided using a jet mill (LABOJET, produced by Nippon Pneumatic Mfg. Co., Ltd.) to obtain a toner powder having a mean particle size of about 8 to 12 μm.

Then this toner powder was sieved with a sieving machine (MDS-2: produced by Nippon Pneumatic Mfg. Co., Ltd.) to obtain a toner fine powder having a mean particle size of about 10 μm. 100 parts by weight of this toner fine powder was mixed (treated externally) with 1.0 part by weight of a hydrophobic silica (R972: produced by Nippon Aerosil Co., Ltd.) to obtain a toner.

EXAMPLE 13

A polyester-polyamide block copolymer was obtained used as a resin composition for toner similarly to Example 12 except for using 2.56 kg of a commercially available 6-nylon having a weight mean molecular weight of 10,000 and having a melting point of 220° C. as an amide polymer.

The resultant resin composition for toner was used to produce a toner similarly to Example 12.

COMPARATIVE EXAMPLE 1

A 1 L 4-necked flask fitted with a thermometer, stainless steel stirrer, glass nitrogen gas inlet tube and refluxing condenser was charged with 90 parts by weight of terephthalic acid, 35 parts by weight of 1,4-cyclohexanedimethanol and 80 parts by weight of ethylene oxide adduct of a bisphenol A having 2 ethylene oxide molecule on average added thereto, and the flask was mounted on a mantle heater and supplied with a nitrogen gas via the nitrogen gas inlet tube, and heated under a nitrogen atmosphere and then supplemented with 0.05 g of dibutyltin oxide and reacted constantly at 200° C., and then supplemented with 10 parts by weight of trimellitic acid and further reacted to obtain a polyester resin, which was employed as a resin composition for toner.

The resultant resin composition for toner was used to produce a toner similarly to Example 1.

COMPARATIVE EXAMPLE 2

A 1 L 4-necked flask fitted with a thermometer, stainless steel stirrer, glass nitrogen gas inlet tube and refluxing condenser was charged with 90 moles of terephthalic acid, 10 moles of isophthalic acid, 30 moles of ethylene glycol and 90 moles of neopentyl glycol, and the flask was mounted on a mantle heater and supplied with a nitrogen gas via the nitrogen gas inlet tube, and heated under a nitrogen atmosphere and then supplemented with 0.05 g of dibutyltin oxide and reacted constantly at 200° C. to obtain a polyester resin, which was employed as a resin composition for toner.

The resultant resin composition for toner was used to produce a toner similarly to Example 1.

The resultant resin composition for toner was used to evaluate the fixation performance of the toner, but the toner was not fixed, and thus could not be examined for the low temperature fixation performance, high temperature offset resistance or lowest fixation temperature.

COMPARATIVE EXAMPLE 3

Similarly to Comparative Example 1 except for using 95 parts by weight of terephthalic acid and 5 parts by weight of trimellitic acid, a polyester resin and a resin composition for toner were obtained and a toner was produced.

The resin composition for toner and toner obtained in Examples 1 to 13 and Comparative Examples 1 to 3 were employed to conduct the evaluation mentioned below. The results are shown in Tables 1, 2, 3, 4 and 5.

[Weight Mean Molecular Weight]

(1) Crystalline Polyester Polymer

As a GPC measurement device, a HTR-C produced by Nihon Millipore Ltd. was employed as a GPC measurement device together with a HFIP-806 M (two units) produced by SHOWA DENKO K.K. as columns attached in tandem to measure a weight mean molecular weight. The measurement conditions involved the temperature of 40° C., 0.1% by weight solution in hydroxyfluoroisopropanol (HFIP) as a sample (filtered through 0.45 μm membrane), injection volume of 100 μl, 0.68 g/L TFA in HFIP as a carrier solvent. A standard polystyrene as a correction sample.

(2) Non-Crystalline Polyester Polymer

As a GPC measurement device, a HTR-C produced by Nihon Millipore Ltd. was employed as a GPC measurement device together with a KF-800P (one unit), KF-806M (two units), KF-802.5 (one unit) produced by SHOWA DENKO K.K. as columns attached in tandem to measure a weight mean molecular weight. The measurement conditions involved the temperature of 40° C., 0.2% by weight solution in THF as a sample (filtered through 0.45 μm membrane), injection volume of 100 μl, THF as a carrier solvent and a standard polystyrene as a correction sample.

[Glass Transition Point (Tg)]

As a differential scanning calorimeter, a DSC-6200R produced by SEIKO INSTRUMENTS INC. was used in the measurement at the temperature elevation rate of 10° C./minute in accordance with JIS K 7121, and the intermediate glass transition point specified in this standard (9.3 "Method for measuring glass transition point) was obtained.

[Crystal Melting Point (Tm)]

As a differential scanning calorimeter, a DSC-6200R produced by SEIKO INSTRUMENTS INC. was used to heat 10 mg of a sample at the temperature elevation rate of 10° C./minute in accordance with JIS K 7121, and the melting peak value specified in this standard (9.1 "Method for measuring melting temperature) was obtained, and designated as the crystal melting point Tm.

[Color Tone]

The color of the resin composition for toner obtained in each of the Examples and Comparative Examples was observed visually.

[Storage Modulus]

As a measurement device, a RDA-700 produced by Rheometric Scientific F.E. Ltd. was employed over the range from 60 to 300° C. at a temperature elevation rate of 10° C./minute under a conditions involving the frequency of 15.92 Hz and a strain of 1% in accordance with JIS K 7198 by sandwiching a sample between 2 parallel discs (diameter: 25 mm), the lower one of which was rotated to impart the sample with a deformation, the torque of which was measured to obtain a storage modulus G, and then the temperature range over which the storage modulus G exhibited almost no change and the storage modulus G within this range were obtained.

When there was almost no range over which the storage modulus G exhibited almost no change, then the result was designated in the table as "None".

[Blocking Rate]

A blocking rate was measured in a procedure in which a crystalline polyester resin or crystalline polyamide resin having a weight mean molecular weight of 10,000 and having an identical composition to that of said crystalline polyester segment or crystalline polyamide segment was heated to a temperature higher slightly than the melting point at the temperature elevating rate of 10° C./minute using a differential scanning calorimeter and then cooled rapidly to 0° C. at the temperature descending rate of 50° C./minute or more to delete the thermal hysteresis preliminarily and then heated again at the temperature elevating rate of 10° C./minute to measure the differential calorie of the crystalline polyester resin or crystalline polyamide resin, then the endothermic calorie (Sa) of the crystal melting endothermic peak per unit resin weight of the crystalline polyester resin or crystalline polyamide resin was calculated from the peak area of the crystal melting endothermic peak, and then said polyester block copolymer or polyester-polyamide block copolymer was heated to a temperature higher slightly than the melting point at the temperature elevating rate of 10° C./minute using a differential scanning calorimeter and then cooled rapidly to 0° C. at the temperature descending rate of 50° C./minute or more to delete the thermal hysteresis preliminarily then measured again the differential calorie of the the polyester block copolymer or polyester-polyamide block copolymer at the temperature elevating rate of 10° C./minute, while the resin weight of the crystalline polyester polymer or crystalline polyamide polymer in the copolymer was calculated from the resin weight of the polyester block copolymer or polyester-polyamide block copolymer used in the measurement then the endothermic calorie (Sb) of the crystal melting endothermic peak per unit resin weight of the crystalline polyester polymer or crystalline polyamide polymer was calculated from the peak area of the crystal melting endothermic peak of the crystal part of the copolymer, and defined as ((Sb/Sa)×100).

[Blocking]

10 g of the resultant toner was placed in a 100 mL sample bottle, which was allowed to stand in a thermostat chamber at 50° C. for 8 hours, and then a powder tester (produced by Hosokawa Micron Corporation) was employed to sieve the sample through a 250 μm filter, which was examined for any remaining aggregated matter, and when there was an aggregated matter then the weight (% by weight) of the aggregated matter based on the toner weight was calculated.

[Filming Test]

10,000 sheets were printed and the fixation roller was examined visually for any depositing tone, and when there was no toner deposition the toner was judged as "Filming not observed".

[Gloss Test]

A glossmeter (UGV-50 produced by Suga Test Instruments Co., Ltd.,) was employed to measure a gloss by mounting a test piece which had been painted black with a black toner prepared using an inventive resin composition for toner in the glossmeter with setting the light path to give the reflection angle of 75 degree.

[High Temperature Offset Temperature and Low Temperature Offset Temperature]

6.5 parts by weight of the toner obtained in each of the Examples and Comparative Examples was combined with 93.5 parts by weight of the iron powder carrier having a mean particle size of 50 to 80 μm to produce a developing agent. As an electrophotographic copier, a UBIX4160AF produced by Konica Corporation which was modified so that the temperature of the heat fixation roller could be set as high as 210° C. at maximum was employed.

By changing the temperature setting of the heat fixation roller stepwise, a reproduced paper on which a non-fixed toner image had been fixed on a copy paper by the heat fixation roller at each temperature setting was obtained.

The resultant reproduced paper was examined visually for any toner dirt on the margin or fixed image, and the temperature range over which no dirt was found was designated as a non-offset temperature range. The maximum temperature of the non-offset temperature range was designated as a high temperature offset temperature, while the minimum was designated as a low temperature offset temperature. In addition, when no high temperature offset occurred at 210° C., then the speed of the heat fixation roller was increased gradually from the ordinary speed (200 mm/sec), and the heat fixation roller speed at which the high temperature offset occurred was used as a basis for evaluating the offset resistance. A slower roller speed indicates a more excellent offset resistance.

[Lowest Fixation Temperature of Toner]

The reproduction was conducted with changing the temperature setting of the heat fixation roller of the electrophotographic copying machine stepwise, and when there was no toner dirt on the margin or the fixed image with no fogging thereon and the reduction in density of the fixed image was less than 10% after rubbing the fixed image on the resultant reproduced paper with a sandy eraser for a typewriter, then the fixation was judged to give a satisfactory result, the lowest temperature for which was measured.

In addition, the density of an image was obtained by using a MACHBETH photometer.

TABLE 1

| | | | | Example 1 | Example 2 | Example 3 | Example 4 | Example 5 |
|---|---|---|---|---|---|---|---|---|
| Polyester block copolymer | Oligomer | High melting point crystalline polyester oligomer | Terephthalic acid (mol) | 100 | 100 | 100 | 100 | 100 |
| | | | 1,4-Cyclohexane-dimethanol (mol) | 68 | 68 | 68 | 68 | 68 |
| | | | Ethylene glycol (mol) | 52 | 52 | 52 | 52 | 52 |
| | | | 1,4-Butanediol (mol) | — | — | — | — | — |
| | | | Melting point (° C.) | 220 | 220 | 220 | 220 | 220 |
| | | | Molecular weight | 3000 | 10000 | 10000 | 3000 | 10000 |
| | | Non-crystalline polyester oligomer | Dimethyl terephthalate (mol) | 90 | 90 | 90 | 90 | 90 |
| | | | Dimethyl isophthalate (mol) | 10 | 10 | 10 | 100 | 10 |
| | | | Neopentyl glycol (mol) | 90 | 90 | 90 | 90 | 90 |
| | | | Ethylene glycol (mol) | 30 | 30 | 30 | 3000 | 30 |
| | | | Glass transition point (° C.) | 55 | 48 | 55 | 48 | 55 |
| | | | Molecular weight | 10000 | 5000 | 10000 | 5000 | 10000 |
| | Incorporation | High melting point crystalline | | 40 | 20 | 20 | 20 | 10 |

TABLE 1-continued

|  |  |  | Example 1 | Example 2 | Example 3 | Example 4 | Example 5 |
|---|---|---|---|---|---|---|---|
| | Evaluation | polyester oligomer (% by weight) | — | — | — | — | — |
| | | Low melting point crystalline polyester oligomer (% by weight) | | | | | |
| | | Non-crystalline polyester oligomer (% by weight) | 60 | 80 | 80 | 80 | 90 |
| | | Weight mean molecular weight | 13000 | 10000 | 17000 | 8000 | 16000 |
| | | Glass transition point (° C.) | 60 | 54 | 63 | 5000 | 62 |
| | | Crystal melting point (° C.) | 210 | 210 | 210 | 210 | No endo-thermic peak |
| | | Color tone | Colorless and transparent | Colorless and transparent | Colorless and transparent | Colorless and transparent | Colorless and transparent |
| | | Temperature range of almost no change in storage modulus G' (° C.) | 160~200 | 160~200 | 160~200 | 160~200 | None |
| | | Storage modulus G' (Pa) | $5 \pm 0.5 \times 10^5$ | $1 \pm 0.5 \times 10^4$ | $1 \pm 0.5 \times 10^4$ | $1 \pm 0.5 \times 10^4$ | None |
| | | Blocking rate (%) | 70 | 65 | 67 | 70 | Measurement impossible |
| Toner evaluation | | Blocking (% by weight) | 1 | 1 | 1 | 2 | 1 |
| | | Filming evaluation | None | None | None | None | None |
| | | Gloss evaluation | 35 | 46 | 27 | 60 | 30 |
| | | High temperature offset temperature (° C.) | >210 | >210 | >210 | >210 | 180 |
| | | Low temperature offset temperature (° C.) | 115 | 95 | 125 | 95 | 125 |
| | | Lowest fixation temperature (° C.) | 125 | 105 | 135 | 105 | 135 |

TABLE 2

| | | | | Example 6 | Example 7 | Example 8 | Example 9 | Example 10 |
|---|---|---|---|---|---|---|---|---|
| Polyester block copolymer | Oligomer | High melting point crystalline polyester oligomer | Terephthalic acid (mol) | 100 | 100 | 100 | 100 | 100 |
| | | | 1,4-Cyclohexane-dimethanol (mol) | — | — | 68 | — | — |
| | | | Ethylene glycol (mol) | — | — | 52 | — | — |
| | | | 1,4-Butanediol (mol) | 120 | 120 | — | 120 | 120 |
| | | | Melting point (° C.) | 232 | 232 | 220 | 232 | 232 |
| | | | Molecular weight | 10000 | 20000 | 10000 | 10000 | 10000 |
| | | Non-crystalline polyester oligomer | Dimethyl terephthalate (mol) | 90 | 90 | 90 | 90 | 90 |
| | | | Dimethyl isophthalate (mol) | 10 | 10 | 10 | 10 | 10 |
| | | | Neopentyl glycol (mol) | 90 | 90 | 90 | 90 | 90 |
| | | | Ethylene glycol (mol) | 30 | 30 | 30 | 30 | 30 |
| | | | Glass transition point (° C.) | 55 | 55 | 55 | 55 | 55 |
| | | | Molecular weight | 10000 | 10000 | 10000 | 10000 | 10000 |
| | Incorporation | High melting point crystalline polyester oligomer (% by weight) | | 20 | 10 | 20 | 20 | 20 |
| | | Low melting point crystalline polyester oligomer (% by weight) | | — | — | 10 | 10 | 10 (Blend) |
| | | Non-crystalline polyester oligomer (% by weight) | | 80 | 90 | 70 | 70 | 70 |
| | Evaluation | Weight mean molecular weight | | 17000 | 17000 | 16000 | 16000 | 16000 |
| | | Glass transition point (° C.) | | 63 | 62 | 62 | 62 | 62 |
| | | Crystal melting point (° C.) | | 230 | 230 | 230 | 230 | 230 |
| | | Color tone | | Colorless and transparent | Colorless and transparent | Colorless and transparent | Colorless and transparent | Slightly white turbidity |
| | | Temperature range of almost no change in storage modulus G' (° C.) | | 160~200 | 160~200 | 160~200 | 160~200 | 160~200 |
| | | Storage modulus G' (Pa) | | $2 \pm 0.5 \times 10^4$ | $1 \pm 0.5 \times 10^4$ | $1 \pm 0.5 \times 10^4$ | $1 \pm 0.5 \times 10^4$ | $2 \pm 0.5 \times 10^4$ |
| | | Blocking rate (%) | | 75 | 77 | 65 | 72 | 71 |
| Toner evaluation | | Blocking (% by weight) | | 0 | 0 | 30 | 0 | 1 |
| | | Filming evaluation | | None | None | None | None | None |
| | | Gloss evaluation | | 30 | 29 | 24 | 26 | 120 |
| | | High temperature offset temperature (° C.) | | >210 | >210 | >210 | >210 | 190 |

TABLE 2-continued

|  |  | Example 6 | Example 7 | Example 8 | Example 9 | Example 10 |
|---|---|---|---|---|---|---|
|  | Low temperature offset temperature (° C.) | 115 | 95 | 115 | 95 | 95 |
|  | Lowest fixation temperature (° C.) | 125 | 105 | 115 | 95 | 95 |

TABLE 3

|  |  |  |  | Example 11 |
|---|---|---|---|---|
| Copolymer | Starting polymer | Ester polymer | Dimethyl terephthalate (mol) | 90 |
|  |  |  | Dimethyl isophthalate (mol) | 10 |
|  |  |  | Neopentyl glycol (mol) | 90 |
|  |  |  | Ethylene glycol (mol) | 30 |
|  |  |  | Glass transition point (° C.) | 55 |
|  | Incorporation |  | Amide polymer (% by weight) | 10 |
|  |  |  | Ester polymer (% by weight) | 90 |
|  | Evaluation |  | Weight mean molecular weight | 11000 |
|  |  |  | Glass transition point (° C.) | 55 |
|  |  |  | Crystal melting point (derived from polyamide ° C.) | 215 |
|  |  |  | Crystal melting point (derived from polyester ° C.) | — |
|  |  |  | Color tone | Colorless and transparent |
|  |  |  | Temperature range of almost no change in storage modulus G' (° C.) | 160~200 |
|  |  |  | Storage modulus G' (Pa) | $1 \pm 0.5 \times 10^4$ |
|  |  |  | Blocking rate (%) | 80 |
| Toner evaluation |  |  | Blocking (% by weight) | 0 |
|  |  |  | Filming evaluation | None |
|  |  |  | Gloss evaluation | 42 |
|  |  |  | High temperature offset temperature (° C.) | >210 |
|  |  |  | Low temperature offset temperature (° C.) | 95 |
|  |  |  | Lowest fixation temperature (° C.) | 105 |

TABLE 4

|  |  |  |  | Example 12 | Example 13 |
|---|---|---|---|---|---|
| Copolymer | Starting polymer | Ester polymer | Sebacic acid (mol) | 100 | 100 |
|  |  |  | Ethylene glycol (mol) | 120 | 120 |
|  |  |  | Melting point (° C.) | 75 | 75 |
|  |  | Amide polymer | Melting point (° C.) | 220 | 220 |
|  |  |  | Molecular weight | 20000 | 10000 |
|  | Incorporation |  | Amide polymer (% by weight) | 100 | 20 |
|  |  |  | Ester polymer (% by weight) | 90 | 80 |
|  | Evaluation |  | Weight mean molecular weight | 21000 | 21000 |
|  |  |  | Glass transition point (° C.) | −54 | −52 |
|  |  |  | Crystal melting point (derived from polyamide ° C.) | 216 | 218 |
|  |  |  | Crystal melting point (derived from polyester ° C.) | 74 | 77 |
|  |  |  | Color tone | Transparent and slightly white turbidity | Transparent and slightly white turbidity |
|  |  |  | Temperature range of almost no change in storage modulus G' (° C.) | 160~200 | 160~200 |
|  |  |  | Storage modulus G' (Pa) | $1 \pm 0.5 \times 10^4$ | $1 \pm 0.5 \times 10^4$ |
|  |  |  | Blocking rate (%) | 80 | 81 |
| Toner evaluation |  |  | Blocking (% by weight) | 0 | 0 |
|  |  |  | Filming evaluation | None | None |
|  |  |  | Gloss evaluation | 22 | 23 |
|  |  |  | High temperature offset temperature (° C.) | >210 | >210 |
|  |  |  | Low temperature offset temperature (° C.) | 95 | 95 |
|  |  |  | Lowest fixation temperature (° C.) | 95 | 95 |

TABLE 5

|  | Comparative Example 1 | Comparative Example 2 | Comparative Example 3 |
|---|---|---|---|
| Composition |  |  |  |
| Terephthalic acid | 90 parts by weight | 90 mol | 95 parts by weight |
| Isophthalic acid | — | 10 mol | — |
| Ethylene oxide adduct of bisphenol A | 80 parts by weight | — | 80 parts by weight |
| Trimellitic acid | 10 parts by weight | — | 5 parts by weight |
| 1,4-Cyclohexane | 35 parts by weight | — | 35 parts by weight |
| Neopentyl glycol (mol) | — | 90 mol | — |
| Ethylene glycol (mol) | — | 30 mol | — |
| Evaluation |  |  |  |
| Weight mean molecular weight | — | 12000 | — |
| Glass transition point (° C.) | 60 | 60 | 55 |
| Crystal melting point (° C.) | — | — | — |
| Color tone | Transparent pale yellow | Colorless and transparent | Transparent pale yellow |
| Temperature range of almost no change in storage modulus G'(° C.) | 160~200 | None | 150~170 |
| Storage modulus G' (Pa) | 1 ± 0.5 × 10⁴ | None | 1 ± 0.5 × 10⁴ |
| Blocking rate (%) | 0 | 0 | 0 |
| Blocking (% by weight) | 4 | 8 | 25 |
| Filming evaluation | Observed | Observed | Observed |
| Gloss evaluation | 2 | Measurement impossible | 7 |
| High temperature offset temperature (° C.) | >210 | None | 180 |
| Low temperature offset temperature (° C.) | 130 | None | 125 |
| Lowest fixation temperature(° C.) | 145 | None | 135 |

EXAMPLES 14 AND 15

A polyester-polyamide block copolymer was obtained similarly to Example 12 except for changing the conditions shown in Table 6.

Using the resin composition for toner and the toner obtained in Examples 14 and 15, the evaluation was made similarly mentioned above. The results are shown in Tables 6.

TABLE 6

|  |  |  |  | Example 14 | Example 15 |
|---|---|---|---|---|---|
| Polyester-polyamide block copolymer | Composition | Polyamide | Kind | 6-Nylon | 6-Nylon |
|  |  |  | Melting point (° C.) | 230 | 230 |
|  |  |  | Weight mean molecular weight | 20000 | 20000 |
|  |  | Non-crystalline polyester | Dimethyl terephthalate (mol) | 45 | 45 |
|  |  |  | Adipic acid (mol) | 5 | 5 |
|  |  |  | Ethylene glycol (mol) | 50 | 50 |
|  |  |  | Neopentyl glycol (mol) | 50 | 50 |
|  |  | Crystalline polyester | Decamethylenedicarboxylic acid (mol) | 50 | — |
|  |  |  | Hexanediol (mol) | 100 | — |
|  | Incorporation |  | Polyamide (% by weight) | 20 | 20 |
|  |  |  | Non-crystallein polyester (% by weight) | 50 | 80 |
|  |  |  | Crystalline polyester (% by weight) | 30 | — |
|  | Evaluation |  | Weight mean molecular weight | 60000 | 60000 |
|  |  |  | Glass transition point (derived from Non-crystallein polyester ° C.) | 62 | 63 |
|  |  |  | Crystal melting point (derived from polyamide ° C.) | 181 | 179 |
|  |  |  | Crystal melting point (derived from crystalline polyester ° C.) | 78 | — |
| Low melting point crystalline polyester (for blend) | Composition |  | Decamethylenecarboxylic acid (mol) | — | 50 |
|  |  |  | Hexanediol (mol) | — | 100 |
|  | Evaluation |  | Crystal melting point (° C.) | — | 80 |
|  |  |  | Weight mean molecular weight | — | 30000 |
| Toner resin | Incorporation |  | Polyester-polyamide block copolymer (% by weight) | 100 | 95 |
|  | Evaluation |  | Low melting point crystalline polyester (for blend, % by weight) | — | 5 |
|  |  |  | Color tone | Colorless and transparent | Colorless and transparent |
|  |  |  | Temperature range of almost no change in storage modulus G' (° C.) | 150~190 | 150~190 |
|  |  |  | Storage modulus G' (Pa) | 1 + 0.5 × 10⁴ | 1 ± 0.5 × 10⁴ |
|  |  |  | Blocking rate (%) | 75 | 75 |
| Toner evaluation |  |  | Blocking (% by weight) | 0 | 1 |
|  |  |  | Filming evaluation | None | None |

TABLE 6-continued

|  | Example 14 | Example 15 |
|---|---|---|
| Gloss evaluation | 28 | 32 |
| High temperature offset temperature (° C.) | 190 | 190 |
| Low temperature offset temperature (° C.) | 95 | 95 |
| Lowest fixation temperature (° C.) | 105 | 100 |

EXAMPLE 16

(1) Production of High Melting Point Crystalline Polyester (for Copolymerization)

A 60 L reaction container was fitted with a distillation tower, a water separator, a nitrogen gas inlet tube, a thermometer and a stirrer in an ordinary manner, and charged in a nitrogen gas atmosphere with 100 moles of terephthalic acid as a dicarboxylic acid component and 68 moles of 1,4-cyclohexanedimethanol and 52 moles of ethylene glycol as diol components and 0.05 moles of titanium tetrabutoxide (TTB) as an esterification condensation catalyst, which were subjected to an esterification reaction while distilling the generated water and methanol off via the rectifying tower at 220° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened, whereby reducing the pressure of the reaction system to 665 Pa or less, and conducting the condensation reaction with stirring at 60 rpm at 240° C., while the free diol generated in the condensation reaction was allowed to distilled off into the outside of the reaction system, whereby obtaining a high melting point polyester polymer.

(2) Production of Non-crystalline Polyester (for Copolymerization)

A 60 L reaction container was fitted with a distillation tower, a water separator, a nitrogen gas inlet tube, a thermometer and a stirrer in an ordinary manner, and charged in a nitrogen gas atmosphere with 90 moles of dimethyl terephthalate as a dicarboxylic acid component, 10 moles of dimethyl isophthalate as a bending monomer component, 90 moles of neopentyl glycol as a branched monomer component, 30 moles of ethylene glycol as an another diol component and 0.05 moles of titanium tetrabutoxide (TTB) as an esterification condensation catalyst, which were subjected to an esterification reaction while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less and conducting the condensation reaction with stirring at 60 rpm at 240° C., while the free diol generated in the condensation reaction was allowed to distilled off into the outside of the reaction system, whereby obtaining a non-crystalline polyester polymer.

(3) Production of Polyester Block Copolymer

A 60 L reaction container was fitted with a distillation tower, a water separator, a nitrogen gas inlet tube, a thermometer and a stirrer in an ordinary manner, and charged in a nitrogen gas atmosphere with 40% by weight of the high melting point crystalline polyester polymer, 60% by weight of the non-crystalline polyester polymer and 0.11 moles of phosphorous acid which corresponded to an amount slightly in excess of the equimolar amount of the total TTB employed in the productions of the crystalline polyester polymer and the non-crystalline polyester polymer, and at the time when the crystals in the reaction container were melted the system was kept at a constant temperature while the pressure of the system was reduced to 665 Pa or less to conduct the reaction with stirring at 60 rpm, and then at the time when the initially turbid molten matter in the reaction container became transparent the reaction was terminated to obtain a polyester block copolymer. This was employed as a resin composition for toner.

(4) Production of Non-crystalline Polyester (for Blend)

A 60 L reaction container was fitted with a distillation tower, a water separator, a nitrogen gas inlet tube, a thermometer and a stirrer in an ordinary manner, and charged in a nitrogen gas atmosphere with 90 moles of dimethyl terephthalate as a dicarboxylic acid component, 10 moles of dimethyl isophthalate as a bending monomer component, 90 moles of neopentyl glycol as a branched monomer component, 30 moles of ethylene glycol as an another diol component and 0.05 moles of titanium tetrabutoxide (TTB) as an esterification condensation catalyst, which were subjected to an esterification reaction while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less and conducting the condensation reaction with stirring at 60 rpm at 240° C., while the free diol generated in the condensation reaction was allowed to distilled off into the outside of the reaction system, whereby obtaining a non-crystalline polyester polymer.

(5) Production of Toner 40 parts by weight of the polyester block copolymer mentioned above and 60 parts by weight of the non-crystalline polyester for blend as resin composition for toner were combined with 1 part by weight of a charge controller (TN-105: produced by HODOGAYA CHEMICAL CO,. LTD.) and 5 parts by weight of a magenta pigment classified into carmine 6B, and mixed thoroughly using a henshcel mixer, and then kneaded at 130° C., cooled and ground coarsely. Subsequently, this was finely divided using a jet mill (LABOJET, produced by Nippon Pneumatic Mfg. Co., Ltd.) to obtain a toner powder having a mean particle size of about 8 to 12 μm.

Then this toner powder was sieved with a sieving machine (MDS-2: produced by Nippon Pneumatic Mfg. Co., Ltd.) to obtain a toner fine powder having a mean particle size of about 10 μm. 100 parts by weight of this toner fine powder was mixed (treated externally) with 1.0 part by weight of a hydrophobic silica (R972: produced by Nippon Aerosil Co., Ltd.) to obtain a toner.

EXAMPLES 17 TO 19

A resin composition for toner was obtained similarly to Example 16 except for changing the amounts of the respective components as shown in Table 7 in the production of the polyester block copolymer and the non-crystalline polyester for blend.

The resultant resin composition for toner was used to produce a toner similarly to Example 16.

EXAMPLE 20

(1) Production of Low Melting Point Crystalline Polyester (for Blend)

A 60 L reaction container was fitted with a distillation tower, a water separator, a nitrogen gas inlet tube, a thermometer and a stirrer in an ordinary manner, and charged in a nitrogen gas atmosphere with 100 moles of decamethylenedicarboxylic acid as a dicarboxylic acid component and 120 moles of 1,6-hexanediol as a diol component and 0.05 moles of titanium tetrabutoxide (TTB) as an esterification condensation catalyst, which were subjected to an esterification reaction while distilling the generated water off via the distillation tower at 220° C. At the time when no water was distilled off via the distillation tower, the esterification reaction was terminated.

After terminating the esterification reaction, the opening of the 60 L reaction container communicating with the distillation tower was closed and the line to the vacuum pump was opened, whereby reducing the pressure of the reaction system to 665 Pa or less, and conducting the condensation reaction with stirring at 60 rpm at 240° C., while the free diol generated in the condensation reaction was allowed to distilled off into the outside of the reaction system, whereby obtaining a low melting point crystalline polyester polymer.

A resin composition for toner was obtained similarly to Example 16 except for changing the amounts of the respective components as shown in Table 8 in the production of the polyester block copolymer and the non-crystalline polyester for blend.

The resultant resin composition for toner was used to produce a toner similarly to Example 16.

EXAMPLE 21

A resin composition for toner was obtained similarly to Example 16 except for changing the amounts of the respective components as shown in Table 8 in the production of the polyester block copolymer and the non-crystalline polyester for blend and also similarly to EXAMPLE 20 except for changing the amounts of the respective components as shown in Table 8 in the production of the low melting point crystalline polyester.

The resultant resin composition for toner was used to produce a toner similarly to Example 16.

COMPARATIVE EXAMPLE 4

A resin composition for toner was obtained similarly to Example 16 except for changing the amounts of the respective components as shown in Table 8 in the production of the polyester block copolymer and the non-crystalline polyester for blend.

The resultant resin composition for toner was used to produce a toner similarly to Example 16.

Using the resin composition for toner and the toner obtained in Examples 16 to 21 and Comparative Example 4, the evaluation was made similarly mentioned above. The results are shown in Tables 7 and 8.

TABLE 7

| | | | | Example 16 | Example 17 | Example 18 | Example 19 |
|---|---|---|---|---|---|---|---|
| Polyester block copolymer | Oligomer | High melting point crystalline polyester oligomer | Terephthalic acid (mol) | 100 | 100 | 100 | 100 |
| | | | 1,4-Cyclohexanedimethanol (mol) | 68 | — | — | — |
| | | | Ethylene glycol (mol) | 52 | — | — | 120 |
| | | | 1,4-Butanediol (mol) | — | 120 | 120 | — |
| | | | Melting point (° C.) | 220 | 230 | 230 | 270 |
| | | | Molecular weight | 50000 | 50000 | 50000 | 50000 |
| | | Non-crystalline polyester oligomer | Dimethyl terephthalate (mol) | 90 | 100 | 100 | 100 |
| | | | Dimethyl isophthalate (mol) | 100 | — | — | — |
| | | | Neopentyl glycol (mol) | 90 | 60 | 120 | 60 |
| | | | Ethylene glycol (mol) | 30 | 60 | 60 | 60 |
| | | | Glass transition point (° C.) | 64 | 67 | 75 | 72 |
| | | | Molecular weight | 60000 | 120000 | 100000 | 140000 |
| | Incorporation | High melting point crystalline polyester oligomer (% by weight) | | 40 | 30 | 50 | 30 |
| | | Non-crystalline polyester oligomer (% by weight) | | 60 | 70 | 50 | 70 |
| | Evaluation | Weight mean molecular weight | | 60000 | 120000 | 75000 | 100000 |
| | | Glass transition point (° C.) | | 65 | 67 | 72 | 69 |
| | | Crystal melting point (° C.) | | 210 | 228 | 215 | 238 |
| Non-crystalline polyester | Incorporation | Dimethyl terephthalate (mol) | | 90 | 90 | 90 | 95 |
| | | Dimethyl isophthalate (mol) | | 10 | 10 | 5 | 5 |
| | | Phthalic anhydride (mol) | | — | — | 5 | — |
| | | Neopentyl glycol (mol) | | 90 | 60 | 120 | 60 |
| | | Ethylene glycol (mol) | | 30 | 60 | — | 60 |
| | Evaluation | Glass transition point (° C.) | | 58 | 57 | 60 | 65 |
| | | Weight mean molecular weight | | 16000 | 15000 | 12000 | 18000 |

TABLE 7-continued

|  |  | Example 16 | Example 17 | Example 18 | Example 19 |
|---|---|---|---|---|---|
| Toner resin incorporation | Polyester block copolymer (% by weight) | 40 | 25 | 10 | 15 |
|  | Non-crystalline polyester (blend, % by weight) | 60000 | 75 | 90 | 85 |
|  | Low melting point crystalline polyester (% by weight) | — | — | — | — |
| Toner resin evaluation | Mw ≥ $10^6$ resin content (% by weight) | 0 | 0.8 | 0.5 | 0 |
|  | Mw/Mn | 3.2 | 4.6 | 3.4 | 3.5 |
|  | Color tone of resin | Colorless and transparent | Colorless and transparent | Colorless and transparent | Colorless and transparent |
| Toner evaluation | Blocking (% by weight) | 1 | 1 | 0.5 | 0.3 |
|  | Filming evaluation | None | None | None | None |
|  | Gloss evaluation | 18 | 16 | 20 | 15 |
|  | High temperature offset temperature (° C.) | >210 | >210 | >210 | >210 |
|  | Heat fixation roller speed (mm/sec) | 120 | 80 | 120 | 120 |
|  | Low temperature offset temperature (° C.) | 100 | 95 | 100 | 105 |
|  | Lowest fixation temperature (° C.) | 110 | 105 | 110 | 115 |

TABLE 8

|  |  |  |  | Example 20 | Example 21 | Comparative Example 4 |
|---|---|---|---|---|---|---|
| Polyester block copolymer | Oligomer | High melting point crystalline polyester oligomer | Terephthalic acid (mol) | 100 | 100 | 100 |
|  |  |  | 1,4-Cyclohexanedimethanol (mol) | — | — | 68 |
|  |  |  | Ethylene glycol (mol) | — | — | 52 |
|  |  |  | 1,4-Butanediol (mol) | 120 | 120 | — |
|  |  |  | Melting point (° C.) | 230 | 230 | 220 |
|  |  |  | Molecular weight | 50000 | 50000 | 100000 |
|  |  | Non-crystalline polyester oligomer | Dimethyl terephthalate (mol) | 100 | 50 | 90 |
|  |  |  | Dimethyl isophthalate (mol) | — | 50 | 10 |
|  |  |  | Neopentyl glycol (mol) | 120 | 60 | 90 |
|  |  |  | Ethylene glycol (mol) | — | 60 | 30 |
|  |  |  | Glass transition point (° C.) | 68 | 53 | 55 |
|  |  |  | Molecular weight | 80000 | 40000 | 10000 |
|  | Incorporation | High melting point crystalline polyester oligomer (% by weight) |  | 20 | 40 | 30 |
|  |  | Non-crystalline polyester oligomer (% by weight) |  | 80 | 60 | 70 |
|  | Evaluation | Weight mean molecular weight |  | 65000 | 40000 | 13000 |
|  |  | Glass transition point (° C.) |  | 66 | 58 | 58 |
|  |  | Crystal melting point (° C.) |  | 214 | 207 | 210 |
| Non-crystalline polyester | Composition | Dimethyl terephthalate (mol) |  | 95 | 90 | — |
|  |  | Dimethyl isophthalate (mol) |  | — | 10 | — |
|  |  | Phthalic anhydride (mol) |  | 5 | — | — |
|  |  | Neopentyl glycol (mol) |  | 100 | 120 | — |
|  |  | Ethylene glycol (mol) |  | 20 | — | — |
|  | Evaluation | Glass transition point (° C.) |  | 55 | 52 | — |
|  |  | Weight mean molecular weight |  | 11000 | 9000 | — |
| Low melting point crystalline polyester | Composition | Decamethylenedicarboxylic acid (mol) |  | 100 | 100 | — |
|  |  | Hexanediol (mol) |  | 120 | 120 | — |
|  | Evaluation | Crystal melting point (° C.) |  | 80 | 80 | — |
|  |  | Weight mean molecular weight |  | 10000 | 10000 | — |
| Toner resin incorporation |  | Polyester block copolymer (% by weight) |  | 8 | 5 | 100 |
|  |  | Non-crystalline polyester (blend, % by weight) |  | 87 | 90 | — |
|  |  | Low melting point crystalline polyester (% by weight) |  | 5 | 5 | — |
| Toner resin evaluation |  | Mw ≥ $10^6$ resin content (% by weight) |  | 0.3 | 0 | 0.5 |
|  |  | Mw/Mn |  | 3 | 2.9 | 2.6 |
|  |  | Color tone of resin |  | Colorless and transparent | Colorless and transparent | Colorless and transparent |
| Toner evaluation |  | Blocking (% by weight) |  | 0.5 | 1 | 1 |
|  |  | Filming evaluation |  | None | None | None |
|  |  | Gloss evaluation |  | 18 | 30 | 36 |
|  |  | High temperature offset temperature (° C.) |  | >210 | >210 | >210 |
|  |  | Heat fixation roller speed (mm/sec) |  | 120 | 120 | 180 |
|  |  | Low temperature offset temperature (° C.) |  | 100 | 95 | 115 |
|  |  | Lowest fixation temperature (° C.) |  | 110 | 105 | 125 |

EXAMPLE 22

(1) Production of Polyester-polyamide Block Copolymer

A 60 L reaction container was fitted with a distillation tower, a water separator, a nitrogen gas inlet tube, a thermometer and a stirrer in an ordinary manner, and charged in a nitrogen gas atmosphere with 50 moles of dimethyl terephthalate as a dicarboxylic acid component, 50 moles of neopentyl glycol as a branched monomer component, 50 moles of ethylene glycol as an another diol component and 0.05 moles of titanium tetrabutoxide (TTB) as an esterification condensation catalyst together with 1.34 kg of a commercially available 6-nylon (T-850: produced by Toyobo. Co., Ltd.) having a weight molecular weight of 40,000 and having a melting point of 230° C. as an amide polymer in an amount corresponding to 10% by weight of the product polymer.

The esterification reaction was conducted while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less, and the free diol generated in the condensation reaction was allowed to distilled off into the outside of the reaction system with stirring at 60 rpm at 240° C. to obtain an ester polymer while effecting the block polymerization with the 6-nylon. When the reaction was almost completed, 0.06 mole of phosphorous acid was added and the mixture was stirred for 5 minutes to obtain a polyester-polyamide block copolymer.

(2) Production of Non-crystalline Polyester (for Blend)

A 60 L reaction container was fitted with a distillation tower, a water separator, a nitrogen gas inlet tube, a thermometer and a stirrer in an ordinary manner, and charged in a nitrogen gas atmosphere with 90 moles of dimethyl terephthalate as a dicarboxylic acid component, 10 moles of dimethyl isophthalate as a bending monomer component, 60 moles of neopentyl glycol as a branched monomer component, 60 moles of ethylene glycol as an another diol and 0.05 moles of titanium tetrabutoxide (TTB) as an esterification condensation catalyst, which were subjected to an esterification reaction while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less and conducting the condensation reaction with stirring at 60 rpm at 240° C., while the free diol generated in the condensation reaction was allowed to distilled off into the outside of the reaction system, whereby obtaining a non-crystalline polyester polymer.

(3) Production of Toner 35 parts by weight of the polyester-polyamide block copolymer mentioned above and 65 parts by weight of the non-crystalline polyester for blend as resin composition for toner were combined with 1 part by weight of a charge controller (TN-105: produced by HODOGAYA CHEMICAL CO,. LTD.) and 5 parts by weight of a magenta pigment classified into carmine 6B, and mixed thoroughly using a henshcel mixer, and then kneaded at 130° C., cooled and ground coarsely. Subsequently, this was finely divided using a jet mill (LABOJET, produced by Nippon Pneumatic Mfg. Co., Ltd.) to obtain a toner powder having a mean particle size of about 8 to 12 μm.

Then this toner powder was sieved with a sieving machine (MDS-2: produced by Nippon Pneumatic Mfg. Co., Ltd.) to obtain a toner fine powder having a mean particle size of about 10 μm. 100 parts by weight of this toner fine powder was mixed (treated externally) with 1.0 part by weight of a hydrophobic silica (R972: produced by Nippon Aerosil Co., Ltd.) to obtain a toner.

EXAMPLE 23

A resin composition for toner was obtained similarly to Example 22 except for changing the amounts of the respective components as shown in Table 9 in the production of the polyester-polyamide block copolymer and the non-crystalline polyester for blend.

The resultant resin composition for toner was used to produce a toner similarly to Example 22.

EXAMPLE 24

(1) Production of Low Melting Point Crystalline Polyester (for Blend)

A 60 L reaction container was fitted with a distillation tower, a water separator, a nitrogen gas inlet tube, a thermometer and a stirrer in an ordinary manner, and charged in a nitrogen gas atmosphere with 50 moles of decamethylenecarboxylic acid as a dicarboxylic acid component and 100 moles of hexanediol as a diol component and 0.05 moles of titanium tetrabutoxide (TTB) as an esterification condensation catalyst, which were subjected to an esterification reaction while distilling the generated water and methanol off via the distillation tower at 220° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened, whereby reducing the pressure of the reaction system to 665 Pa or less, and conducting the condensation reaction with stirring at 60 rpm at 240° C., while the free diol generated in the condensation reaction was allowed to distilled off into the outside of the reaction system, whereby obtaining a crystalline polyester polymer.

A resin composition for toner was obtained similarly to Example 22 except for changing the amounts of the respective components as shown in Table 9 in the production of the polyester-polyamide block copolymer.

EXAMPLES 25 AND 26

A resin composition for toner was obtained similarly to Example 22 except for changing the amounts of the respective components as shown in Table 10 in the production of the polyester-polyamide block copolymer and the non-crystalline polyester for blend.

The resultant resin composition for toner was used to produce a toner similarly to Example 22.

COMPARATIVE EXAMPLE 5

(1) Production of Non-crystalline Polyester

A 60 L reaction container was fitted with a distillation tower, a water separator, a nitrogen gas inlet tube, a thermometer and a stirrer in an ordinary manner, and charged in a nitrogen gas atmosphere with 90 moles of dimethyl terephthalate as a dicarboxylic acid component, 5 moles of dimethyl isophthalate and 5 moles of phthalic anhydride as bending monomer components, 60 moles of neopentyl glycol as a branched monomer component, 60 moles of ethylene glycol as an another diol component component and 0.05 moles of titanium tetrabutoxide (TTB) as an esterification condensation catalyst, which were subjected to an esterification reaction while distilling the generated water and methanol off via the distillation tower at 200° C. At the time when no water and methanol was distilled off via the distillation tower, the esterification reaction was terminated.

After terminating the esterification reaction, the opening of the 60 L reaction container communicating with the distillation tower was closed and the line to the vacuum pump was opened whereby reducing the pressure of the reaction system to 665 Pa or less and conducting the condensation reaction with stirring at 60 rpm at 240° C., while the free diol generated in the condensation reaction was allowed to distilled off into the outside of the reaction system, whereby obtaining a non-crystalline polyester polymer.

The resultant resin was used to produce a toner similarly to Example 22.

Using the resin composition for toner and the toner obtained in Examples 22 to 26 and Comparative Example 5, the evaluation was made similarly mentioned above. The results are shown in Tables 9 and 10.

TABLE 9

|  |  |  |  | Example 22 | Example 23 | Example 24 |
|---|---|---|---|---|---|---|
| Polyester-polyamide block copolymer | Composition | Polyamide | Nylon | 6-Nylon | 6-Nylon | 6-Nylon |
|  |  |  | Melting point (° C.) | 230 | 230 | 230 |
|  |  |  | Weight mean molecular weight | 20000 | 40000 | 40000 |
|  |  | Non-crystalline polyester | Dimethyl terephthalate (mol) | 50 | 45 | 45 |
|  |  |  | Adipic acid (mol) | — | 5 | 5 |
|  |  |  | Ethylene glycol (mol) | 50 | 50 | 50 |
|  |  |  | Neopentyl glycol (mol) | 50 | 50 | 50 |
|  |  | Crystalline polyester | Sebacic acid (mol) | — | — | — |
|  |  |  | Ethylene glycol (mol) | — | — | — |
|  | Incorporation |  | Polyamide (% by weight) | 10 | 20 | 30 |
|  |  |  | Non-crystalline polyester oligomer (% by weight) | 90 | 80 | 70 |
|  |  |  | Crystalline polyester oligomer (% by weight) | — | — | — |
|  | Evaluation |  | Weight mean molecular weigh | 60000 | 60000 | 120000 |
|  |  |  | Glass transition point (derived from non-crystalline polyester, ° C.) | 69 | 63 | 63 |
|  |  |  | Glass transition point (derived from polyamide, ° C.) | 171 | 179 | 184 |
|  |  |  | Crystal melting point (derived from crystalline polyester, ° C.) | — | — | — |
| Non-crystalline polyester | Composition |  | Dimethyl terephthalate (mol) | 90 | 90 | 90 |
|  |  |  | Dimethyl isophthalate (mol) | 10 | 5 | — |
|  |  |  | Phthalic anhydride (mol) | — | 5 | 10 |
|  |  |  | Neopentyl glycol (mol) | 60 | 60 | 60 |
|  |  |  | Ethylene glycol (mol) | 60 | 60 | 60 |
|  | Evaluation |  | Glass transition point (° C.) | 58 | 58 | 57 |
|  |  |  | Weight mean molecular weight | 15000 | 15000 | 15000 |
| Low melting point crystalline polyester | Composition |  | Decamethylenedicarboxylic acid (mol) | — | — | 50 |
|  |  |  | Hexanediol (mol) | — | — | 100 |
|  | Evaluation |  | Crystal melting point (° C.) | — | — | 80 |
|  |  |  | Weight mean molecular weight | — | — | 10000 |
| Toner resin incorporation |  |  | Polyester-polyamide block copolymer (% by weight) | 35 | 20 | 10 |
|  |  |  | Non-crystalline polyester (blend, % by weight) | 65 | 80 | 85 |
|  |  |  | Low melting point crystalline polyester (blend, % by weight) | — | — | 5 |
| Toner resin evaluation |  |  | Mw ≧ 10⁶ resin content (% by weight) | 0 | 0 | 0.2 |
|  |  |  | Mw/Mn | 3.7 | 3.3 | 4.5 |
|  |  |  | Color tone of resin | Colorless and transparent | Colorless and transparent | Colorless and transparent |

TABLE 9-continued

|  |  | Example 22 | Example 23 | Example 24 |
|---|---|---|---|---|
| Toner evaluation | Blocking (% by weight) | 1 | 1 | 1 |
|  | Filming evaluation | None | None | None |
|  | Gloss evaluation | 17 | 16 | 16 |
|  | High temperature offset temperature (° C.) | 200 | >210 | >210 |
|  | Heat fixation roller speed (mm/sec) | 120 | 120 | 80 |
|  | Low temperature offset temperature (° C.) | 100 | 95 | 95 |
|  | Lowest fixation temperature (° C.) | 110 | 105 | 100 |

TABLE 10

|  |  |  |  | Example 25 | Example 26 | Comparative Example 5 |
|---|---|---|---|---|---|---|
| Polyester-polyamide block copolymer | Composition | Polyamide | Nylon | 6-Nylon | 6-Nylon | — |
|  |  |  | 1,4-Cyclohexanedimethanol (mol) |  |  |  |
|  |  |  | Melting point (° C.) | 230 | 256 | — |
|  |  |  | Weight mean molecular weight | 10000 | 20000 | — |
|  |  | Non-crystalline polyester | Dimethyl terephthalate (mol) | 40 | — | — |
|  |  |  | Adipic acid (mol) | 10 | — | — |
|  |  |  | Ethylene glycol (mol) | 50 | — | — |
|  |  |  | Neopentyl glycol (mol) | 50 | — | — |
|  |  | Crystalline polyester | Sebacic acid (mol) | — | 50 | — |
|  |  |  | Ethylene glycol (mol) | — | 100 | — |
|  | Incorporation | Polyamide (% by weight) |  | 40 | 50 | — |
|  |  | Non-crystalline polyester oligomer (% by weight) |  | 60 | — | — |
|  |  | Crystalline polyester oligomer (% by weight) |  | — | 50 | — |
|  | Evaluation | Weight mean molecular weigh |  | 60000 | 40000 | — |
|  |  | Glass transition point (derived from non-crystalline polyester, ° C.) |  | 63 | — | — |
|  |  | Glass transition point (derived from polyamide, ° C.) |  | 211 | 232 | — |
|  |  | Crystal melting point (derived from crystalline polyester, ° C.) |  | — | 74 | — |
| Non-crystalline polyester | Composition | Dimethyl terephthalate (mol) |  | 90 | 90 | 90 |
|  |  | Dimethyl isophthalate (mol) |  | — | — | 5 |
|  |  | Phthalic anhydride (mol) |  | 10 | 100 | 5 |
|  |  | Neopentyl glycol (mol) |  | 60 | 60 | 60 |
|  |  | Ethylene glycol (mol) |  | 60 | 60 | 60 |
|  | Evaluation | Glass transition point (° C.) |  | 58 | 58 | 58 |
|  |  | Weight mean molecular weight |  | 16000 | 16000 | 15000 |
| Low melting point crystalline polyester | Composition | Decamethylenedicarboxylic acid (mol) |  | — | — | — |
|  |  | Hexanediol (mol) |  | — | — | — |
|  | Evaluation | Crystal melting point (° C.) |  | — | — | — |
|  |  | Weight mean molecular weight |  | — | — | — |
| Toner resin incorporation |  | Polyester-polyamide block copolymer (% by weight) |  | 5 | 5 | — |
|  |  | Non-crystalline polyester (blend, % by weight) |  | 95 | 95 | 100 |
|  |  | Low melting point crystalline polyester (blend, % by weight) |  | — | — | — |
| Toner resin evaluation |  | Mw ≧ 10$^6$ resin content (% by weight) |  | 0 | 0 | 0 |
|  |  | Mw/Mn |  | 3.3 | 3.2 | 2.7 |
|  |  | Color tone of resin |  | Colorless and transparent | Colorless and transparent | Colorless and transparent |
| Toner evaluation |  | Blocking (% by weight) |  | 1 | 1 | 1 |
|  |  | Filming evaluation |  | None | None | Deposition |
|  |  | Gloss evaluation |  | 17 | 24 | 16 |
|  |  | High temperature offset temperature (° C.) |  | — | — | All range offset |
|  |  | Heat fixation roller speed (mm/sec) |  | 120 | 120 | — |
|  |  | Low temperature offset temperature (° C.) |  | 105 | 115 | All range offset |
|  |  | Lowest fixation temperature (° C.) |  | 115 | 125 | All range offset |

EXAMPLE 27

A polyester block copolymer and a polyester for blend were obtained similarly to Example 21 except for changing the conditions shown in Table 11, and used to produce a resin composition for toner and a toner.

EXAMPLE 28

A polyester-polyamide block copolymer and a polyester for blend were obtained similarly to Example 22 except for changing the conditions shown in Table 11, and used to produce a resin composition for toner and a toner.

Using the resin composition for toner and the toner obtained in Example 27 and 28, the evaluation was made similarly mentioned above. The results are shown in Table 11.

INDUSTRIAL APPLICABILITY

According to the present invention, a resin composition for toner and a toner exhibiting excellent low temperature fixation performance, high temperature offset-resistance and anti-blocking performance and enabling a satisfactory color development can be obtained.

The invention claimed is:

1. A toner
   comprising a colorant and a resin composition which consists essentially of a polyester block copolymer consisting of a crystalline polyester segment having a melting point of 140 to 280° C. and a non-crystalline polyester segment having a glass transition point of 30 to 80° C.;

TABLE 11

| | | | | Example 27 | Example 28 |
|---|---|---|---|---|---|
| Block copolymer | Composition | High melting point crystalline polyester | Terephthalic acid (mol) | 100 | — |
| | | | 1,4-butanediol (mol) | 120 | — |
| | | | Melting point (° C.) | 230 | — |
| | | | Weight mean molecular weight | 50000 | — |
| | | Polyamide | Kind | — | 6-Nylon |
| | | | Melting point (° C.) | — | 230 |
| | | | Weight mean molecular weight | — | 20000 |
| | | Non-crystalline polyester | Dimethyl terephthalate (mol) | 70 | 70 |
| | | | Adipic acid (mol) | 30 | 30 |
| | | | Ethylene glycol (mol) | 100 | 100 |
| | | | Neopentyl glycol (mol) | 100 | 100 |
| | | Low melting point crystalline polyester | Decamethylenedicarboxylic acid (mol) | — | — |
| | | | Hexanediol (mol) | — | — |
| | Incorporation | High melting point crystalline polyester (% by weight) | | 30 | — |
| | | Polyamide (% by weight) | | — | 20 |
| | | Non-crystalline polyester (% by weight) | | 70 | 80 |
| | | Low melting point crystalline polyester (% by weight) | | — | — |
| | Evaluation | Weight mean molecular weigh | | 120000 | 60000 |
| | | Glass transition point (derived from non-crystalline polyester, ° C.) | | 12 | 6 |
| | | Crystal melting point (derived from polyamide, ° C.) | | — | 208 |
| | | Crystal melting point (derived from crystalline polyester, ° C.) | | 218 | — |
| Non-crystalline polyester (for blned) | Composition | Dimethyl terephthalate (mol) | | 90 | 90 |
| | | Dimethyl adipate (mol) | | 5 | 5 |
| | | Dimethyl isophthalate (mol) | | — | — |
| | | Phthalic anhydride (mol) | | 5 | 5 |
| | | Neopentyl glycol (mol) | | 60 | 60 |
| | | Ethylene glycol (mol) | | 60 | 60 |
| | Evaluation | Glass transition point (° C.) | | 54 | 54 |
| | | Weight mean molecular weight | | 12000 | 12000 |
| Low melting point crystalline polyester (for blend) | Composition | Decamethylenecarboxylic acid (mol) | | — | 50 |
| | | Hexanediol (mol) | | — | 100 |
| | Evaluation | Crystal melting point (° C.) | | — | 80 |
| | | Weight mean molecular weight | | — | 10000 |
| Toner resin evaluation | Incorporation | Block copolymer (% by weight) | | 25 | 20 |
| | | Non-crystalline polyester (for blend, % by weight) | | 75 | 3 |
| | | Low melting point crystalline polyester (for blend, % by weight) | | — | 77 |
| | Evaluation | Mw ≧ $10^6$ resin content (% by weight) | | 0.9 | 0 |
| | | Mw/Mn | | 4.8 | 3.4 |
| | | Color tone of resin | | Colorless and transparent | Colorless and transparent |
| Toner evaluation | | Blocking (% by weight) | | 2 | 2.5 |
| | | Filming evaluation | | None | None |
| | | Gloss evaluation | | 21 | 22 |
| | | High temperature offset temperature (° C.) | | 200 | 190 |
| | | Low temperature offset temperature (° C.) | | 95 | 95 |
| | | Lowest fixation temperature (° C.) | | 105 | 100 | which has a storage modulus G depicted in Pa unit, when subjected to a dynamic viscoelasticity test under a condition involving a frequent of 15.92 Hz, a strain of 1%, a temperature of 60 to 300° C. and a temperature elevation rate of 10° C./minute, fulfilling either of the requirement (a), (b) or (c):

(a) when X is assumed to be a constant value selected from an actual number of 1 or more and less than 10, then the range of the temperature fulfilling the requirement defined by the following formula (1) is present over at least 20° C. or more;

(b) when X is assumed to be a constant value selected from an actual number of 1 or more and less than 10, then the range of the temperature fulfilling the requirement defined by the following formula (2) is present over at least 20° C. or more;

then cooled rapidly to 0° C. at the temperature descending rate of 50° C./minute or more to delete the thermal hysteresis preliminarily then heated again at the temperature elevating rate of 10° C./minute to measure the differential calorie of the crystalline polyester resin, then the endothermic calorie (Sa) of the crystal melting endothermic peak per unit resin weight of the crystalline polyester resin is calculated from the peak area of the crystal melting endothermic peak, and then said polyester block copolymer is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then measured again the differential calorie of the polyester block copolymer at the temperature elevating rate of 10° C./minute, while the resin weight of the crystalline polyester segment in said copolymer is calculated from the resin weight of the polyester block copolymer used in the measurement then the endothermic calorie (Sb) of the crystal melting endothermic peak per unit resin weight of the crystalline polyester segment is calculated from the crystal melting endothermic peak area of the crystal part of said copolymer.

2. A toner
comprising a colorant and a resin composition which consists essentially of a polyester block copolymer consisting of a crystalline polyester segment having a melting point of 140 to 280° C. and a non-crystalline polyester segment having a glass transition point of 30 to 80° C.;

wherein said polyester block copolymer has a blocking rate of 10 to 100%, said blocking rate being defined as ((Sb/Sa)×100), when subjected to the procedure:

in which a crystalline polyester resin having a weight mean molecular weight of 10,000 and having an identical composition to that of said crystalline polyester segment is heated to a temperature higher slightly than the melting point at the temperature elevating rate of 10° C./minute using a differential scanning calorimeter comprising a colorant and a resin composition which consists essentially of a polyester-polyamide block copolymer consisting of a crystalline polyamide segment having a melting point of 140 to 280° C. and a non-crystalline polyester segment having a glass transition point of 30 to 80° C.;

wherein said polyester-polyamide block copolymer has a blocking rate of 10 to 100%, said blocking rate being defined as ((Sb/Sa)×100), when subjected to the procedure:

in which a crystalline polyamide resin having a weight mean molecular weight of 10,000 and having an identical composition to that of said crystalline polyamide segment is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then heated again at the temperature elevating rate of 10° C./minute to measure the differential calorie of the crystalline polyamide resin, then the endothermic calorie (Sa) of the crystal melting endothermic peak per unit resin weight of the crystalline polyamide resin is calculated from the peak area of the crystal melting endothermic peak, and then said polyester-polyamide block copolymer is heated to a temperature higher slightly than the melting point at the temperature elevating rate of 10° C./minute using a differential scanning calorimeter then cooled rapidly to 0° C. at the temperature descending rate of 50° C./minute or more to delete the thermal hysteresis preliminarily then measured again the differential calorie of the polyester-polyamide block copolymer at the temperature elevating rate of 10° C./minute, while the resin weight of the crystalline polyamide segment in said copolymer is calculated from the resin weight of the polyester-polyamide block copolymer used in the measurement then the endothermic calorie (Sb) of the crystal melting endothermic peak per unit resin weight of the crystalline polyamide segment is calculated from the crystal melting endothermic peak area of the crystal part of said copolymer.

3. A toner
(c) when X is assumed to be a constant value selected from an actual number of 1 or more and less than 10, then the range of the temperature fulfilling the requirement defined by the following formula (3) is present over at least 20° C. or more;

$$G = (X0.5) \times 10^3 \quad (1)$$

wherein X is a constant value selected from an actual number of 1 or more and less than 10;

$$G = (X0.5) \times 10^4 \quad (2)$$

wherein X is a constant value selected from an actual number of 1 or more and less than 10;

$$G = (X0.5) \times 10^5 \quad (3)$$

wherein X is a constant value selected from an actual number of 1 or more and less than 10.

* * * * *

UNITED STATES PATENT AND TRADEMARK OFFICE
CERTIFICATE OF CORRECTION

| | | |
|---|---|---|
| PATENT NO. | : 7,262,262 B2 | |
| APPLICATION NO. | : 10/474753 | |
| DATED | : August 28, 2007 | |
| INVENTOR(S) | : Kenichi Matsumura, Akihiro Niki and Masayuki Imamura | |

It is certified that error appears in the above-identified patent and that said Letters Patent is hereby corrected as shown below:

Col. 60, line 11 thru Col. 62, line 61, delete the claims and please insert the claims as follows:

--1. A toner comprising a colorant and a resin composition which consists essentially of a polyester block copolymer consisting of a crystalline polyester segment having a melting point of 140 to 280°C and a non-crystalline polyester segment having a glass transition point of 30 to 80°C;

which has a storage modulus G depicted in Pa unit, when subjected to a dynamic viscoelasticity test under a condition involving a frequent of 15.92 Hz, a strain of 1%, a temperature of 60 to 300°C and a temperature elevation rate of 10°C/minute, fulfilling either of the requirement (a), (b) or (c):

(a) when X is assumed to be a constant value selected from an actual number of 1 or more and less than 10, then the range of the temperature fulfilling the requirement defined by the following formula (1) is present over at least 20°C or more;

(b) when X is assumed to be a constant value selected from an actual number of 1 or more and less than 10, then the range of the temperature fulfilling the requirement defined by the following formula (2) is present over at least 20°C or more;

(c) when X is assumed to be a constant value selected from an actual number of 1 or more and less than 10, then the range of the temperature fulfilling the requirement defined by the following formula (3) is present over at least 20°C or more;

$G = (X \pm 0.5) \times 10^3$     (1)

wherein X is a constant value selected from an actual number of 1 or more and less than 10;

$G = (X \pm 0.5) \times 10^4$     (2)

UNITED STATES PATENT AND TRADEMARK OFFICE
CERTIFICATE OF CORRECTION

| | | |
|---|---|---|
| PATENT NO. | : 7,262,262 B2 | |
| APPLICATION NO. | : 10/474753 | |
| DATED | : August 28, 2007 | |
| INVENTOR(S) | : Kenichi Matsumura, Akihiro Niki and Masayuki Imamura | |

It is certified that error appears in the above-identified patent and that said Letters Patent is hereby corrected as shown below:

wherein X is a constant value selected from an actual number of 1 or more and less than 10;

$$G = (X \pm 0.5) \times 10^5 \qquad (3)$$

wherein X is a constant value selected from an actual number of 1 or more and less than 10.

2. A toner comprising a colorant and a resin composition which consists essentially of a polyester block copolymer consisting of a crystalline polyester segment having a melting point of 140 to 280°C and a non-crystalline polyester segment having a glass transition point of 30 to 80°C;

wherein said polyester block copolymer has a blocking rate of 10 to 100%, said blocking rate being defined as $((Sb/Sa) \times 100)$, when subjected to the procedure:

in which a crystalline polyester resin having a weight mean molecular weight of 10,000 and having an identical composition to that of said crystalline polyester segment is heated to a temperature higher slightly than the melting point at the temperature elevating rate of 10°C/minute using a differential scanning calorimeter then cooled rapidly to 0°C at the temperature descending rate of 50°C/minute or more to delete the thermal hysteresis preliminarily then heated again at the temperature elevating rate of 10°C/minute to measure the differential calorie of the crystalline polyester resin, then the endothermic calorie (Sa) of the crystal melting endothermic peak per unit resin weight of the crystalline polyester resin is calculated from the peak area of the crystal melting endothermic peak,

UNITED STATES PATENT AND TRADEMARK OFFICE
CERTIFICATE OF CORRECTION

PATENT NO. : 7,262,262 B2
APPLICATION NO. : 10/474753
DATED : August 28, 2007
INVENTOR(S) : Kenichi Matsumura, Akihiro Niki and Masayuki Imamura It is certified that error appears in the above-identified patent and that said Letters Patent is hereby corrected as shown below:

and then said polyester block copolymer is heated to a temperature higher slightly than the melting point at the temperature elevating rate of 10°C/minute using a differential scanning calorimeter then cooled rapidly to 0°C at the temperature descending rate of 50°C/minute or more to delete the thermal hysteresis preliminarily then measured again the differential calorie of the polyester block copolymer at the temperature elevating rate of 10°C/minute, while the resin weight of the crystalline polyester segment in said copolymer is calculated from the resin weight of the polyester block copolymer used in the measurement then the endothermic calorie (Sb) of the crystal melting endothermic peak per unit resin weight of the crystalline polyester segment is calculated from the crystal melting endothermic peak area of the crystal part of said copolymer.

3. A toner comprising a colorant and a resin composition which consists essentially of a polyester-polyamide block copolymer consisting of a crystalline polyamide segment having a melting point of 140 to 280°C and a non-crystalline polyester segment having a glass transition point of 30 to 80°C;

wherein said polyester-polyamide block copolymer has a blocking rate of 10 to 100%, said blocking rate being defined as ((Sb/Sa) x 100), when subjected to the procedure:

UNITED STATES PATENT AND TRADEMARK OFFICE
CERTIFICATE OF CORRECTION

| | | |
|---|---|---|
| PATENT NO. | : 7,262,262 B2 | |
| APPLICATION NO. | : 10/474753 | |
| DATED | : August 28, 2007 | |
| INVENTOR(S) | : Kenichi Matsumura, Akihiro Niki and Masayuki Imamura | |

It is certified that error appears in the above-identified patent and that said Letters Patent is hereby corrected as shown below:

in which a crystalline polyamide resin having a weight mean molecular weight of 10,000 and having an identical composition to that of said crystalline polyamide segment is heated to a temperature higher slightly than the melting point at the temperature elevating rate of 10°C/minute using a differential scanning calorimeter then cooled rapidly to 0°C at the temperature descending rate of 50°C/minute or more to delete the thermal hysteresis preliminarily then heated again at the temperature elevating rate of 10°C/minute to measure the differential calorie of the crystalline polyamide resin, then the endothermic calorie (Sa) of the crystal melting endothermic peak per unit resin weight of the crystalline polyamide resin is calculated from the peak area of the crystal melting endothermic peak, and then said polyester-polyamide block copolymer is heated to a temperature higher slightly than the melting point at the temperature elevating rate of 10°C/minute using a differential scanning calorimeter then cooled rapidly to 0°C at the temperature descending rate of 50°C/minute or more to delete the thermal hysteresis preliminarily then measured again the differential calorie of the polyester-polyamide block copolymer at the temperature elevating rate of 10°C/minute, while the resin weight of the crystalline polyamide segment in said copolymer is calculated from the resin weight of the polyester-polyamide block copolymer used in the measurement

UNITED STATES PATENT AND TRADEMARK OFFICE
CERTIFICATE OF CORRECTION

PATENT NO. : 7,262,262 B2
APPLICATION NO. : 10/474753
DATED : August 28, 2007
INVENTOR(S) : Kenichi Matsumura, Akihiro Niki and Masayuki Imamura It is certified that error appears in the above-identified patent and that said Letters Patent is hereby corrected as shown below:

then the endothermic calorie (Sb) of the crystal melting endothermic peak per unit resin weight of the crystalline polyamide segment is calculated from the crystal melting endothermic peak area of the crystal part of said copolymer.--

Signed and Sealed this

Seventh Day of April, 2009

JOHN DOLL
*Acting Director of the United States Patent and Trademark Office*